(12) United States Patent
Mathew

(10) Patent No.: US 8,478,076 B2
(45) Date of Patent: Jul. 2, 2013

(54) ALIGNMENT OF DIGITAL IMAGES AND LOCAL MOTION DETECTION FOR HIGH DYNAMIC RANGE (HDR) IMAGING

(75) Inventor: Binu K. Mathew, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 277 days.

(21) Appl. No.: 13/005,243

(22) Filed: Jan. 12, 2011

(65) Prior Publication Data

US 2012/0002890 A1 Jan. 5, 2012

Related U.S. Application Data

(60) Provisional application No. 61/361,488, filed on Jul. 5, 2010, provisional application No. 61/361,880, filed on Jul. 6, 2010.

(51) Int. Cl.
*G06K 9/32* (2006.01)

(52) U.S. Cl.
USPC ........... 382/294; 382/282; 382/284; 382/290; 382/299; 358/1.2; 358/540; 358/450; 358/452

(58) Field of Classification Search
USPC ... 382/278, 282, 284, 290, 294, 299; 358/1.2, 358/540, 450, 452
See application file for complete search history.

(56) References Cited

U.S. PATENT DOCUMENTS

| | | | |
|---|---|---|---|
| 6,750,974 B2 * | 6/2004 | Svetkoff et al. | 356/602 |
| 7,142,723 B2 | 11/2006 | Kang et al. | |
| 7,335,026 B2 * | 2/2008 | Goree et al. | 434/22 |
| 7,783,096 B2 * | 8/2010 | Chen et al. | 382/128 |
| 7,805,011 B2 * | 9/2010 | Klamer et al. | 382/232 |
| 7,972,266 B2 * | 7/2011 | Gobeyn et al. | 600/301 |
| 7,999,873 B2 * | 8/2011 | Oyama et al. | 348/340 |
| 2009/0067752 A1 | 3/2009 | Lee et al. | |
| 2010/0157078 A1 | 6/2010 | Atanassov et al. | |
| 2010/0157079 A1 | 6/2010 | Atanassov et al. | |

FOREIGN PATENT DOCUMENTS

EP 2091255 A1 8/2009

OTHER PUBLICATIONS

Ward, "Fast, Robust Image Registration for Compositing High Dynamic Range Photographs from Handheld Exposures;" CiteSeerx; Journal of Graphics Tools; 2003, 14 pgs.
Kang, et al.; "High Dynamic Range Video;" International Conference on Computer Graphics and Interactive Techniques archive; ACM SIGGRAPH 2003 Papers, 7 pgs.
Grosch; "Fast and Robust High Dynamic Range Image Generation with Camera and Object Movement;" Web publication: http://www.uni-koblenz.de/~cg/Veroeffentlichungen/robust_hdr_vmv06_lores.pdf (date unknown); 9 pgs.

* cited by examiner

*Primary Examiner* — Yosef Kassa
(74) *Attorney, Agent, or Firm* — Wong, Cabello, Lutsch, Rutherford & Brucculeri LLP

(57) ABSTRACT

Image alignment operations particular suited for High Dynamic Range (HDR) image generation are described. Image pyramids may be generated using reference and source images. Difference bitmaps, based on a number of pixel shift combinations in the x and y directions, can be divided into tiles and analyzed and, for each pyramid level, an optimal shift direction determined. The tiles can then be pruned using a threshold such that only those tiles contributing up to the threshold are projected to a subsequent pyramid level. The alignment vector for each level can be aggregated to determine a final alignment vector which can be used to shift the source image. This process may be repeated for another source image, and the two source images and reference image, once aligned, may be merged to generate an HDR image.

19 Claims, 12 Drawing Sheets

ALIGNMENT OF DIGITAL IMAGES AND LOCAL MOTION DETECTION FOR HIGH DYNAMIC RANGE (HDR) IMAGING

CROSS-REFERENCE TO RELATED APPLICATIONS

This application claims the benefit of U.S. Provisional Patent Application No. 61/361,820, entitled "Alignment of Digital Images and Local Motion Detection for HDR Imaging", filed on Jul. 6, 2010, and U.S. Provisional Patent Application No. 61/361,488, entitled "Alignment of Digital Images and Local Motion Detection for HDR Imaging", filed on Jul. 5, 2010, which is herein incorporated by reference.

BACKGROUND

The present disclosure relates generally to high dynamic range (HDR) imaging techniques and, more specifically, to techniques for aligning digital images acquired for an HDR imaging process.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, digital image capture devices have become increasingly popular due, at least in part, to such devices becoming more portable as well as affordable for the average consumer. Further, in addition to a number of stand-alone digital cameras currently available on the market, it is not uncommon for digital imaging devices to be provided as an integrated component of a consumer electronic device, such as a desktop or notebook computer, a cellular telephone, or a portable media player. With regard to digital image capture devices, high dynamic range (HDR) imaging generally relates to a set of imaging techniques that allows for the the capture and representation of a greater dynamic range of luminances between the lightest and darkest areas of an image than standard digital imaging techniques. Wider dynamic ranges allow for HDR images to more accurately represent the wide range of intensity levels found in real-world scenes and, therefore, produce an image that may be more aesthetically pleasing.

One method for capturing HDR images includes the merging of multiple photographs. For instance, this process may include capturing multiple images of an image scene at different exposures in succession, and then processing them to generate a composite HDR image. When multiple images of the same scene are taken using a digital camera, it may be desirable to shift the images so that corresponding points and objects in the images match. For instance, if images are taken in rapid succession in an automated manner, camera shake, using the camera from a moving platform or vehicle, changes in lighting and exposure, may cause successive images to not be in complete alignment, which may result in motion artifacts in the composite HDR image. Further, if local motion, i.e., trees swaying in the wind, people and faces shifting or moving slightly from frame to frame, etc., is detected during the image alignment process, this detection may indicate that blurring may occur in regions of the image containing the local motion, which may cause the final rendered HDR image aesthetically unsuitable.

While some alignment algorithms currently exist, many existing alignment algorithms are designed and/or optimized for desktop computing applications and processors. As portable mobile imaging devices have become increasingly popular, it has become desirable to scale or port such alignment algorithms to run on mobile processors so that certain features (e.g., HDR imaging) may also be available on mobile devices. However, as mobile processors are generally designed with power consumption constraints in mind (e.g., mobile devices are typically powered by a limited power source, such as a battery), they often have lower clock speeds and computing power relative to faster desktop processors of the same generation. Accordingly, when alignment algorithms previously optimized for desktop computing applications are ported to mobile applications, the processing time required for performing the alignment and generating a composite HDR image may greatly increase, which is not only undesirable from a performance standpoint, but may also negatively impact the user experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described in the present disclosure relate generally to the alignment of images, particularly in HDR imaging applications, which may acquire and composite multiple consecutive frames at different exposures. In one embodiment image pyramids may be generated using a reference image and a source image that is to be aligned with the reference image. Each pyramid level may be downscaled with respect a previous level by a factor of 2. Next, bitmap pairs may be generated for each of the source and reference images. Using these bitmaps, a difference bitmap is generated at each pyramid level and may be evaluated over nine possible one-pixel shift combinations in the x and y directions $\{-1, 0, 1\}$. Each difference bitmap is then divided and analyzed in tiles. For each pyramid level beginning from the top (e.g., smallest) level, an optimal shift direction is determined based on the shift case that exhibits the fewest pixel difference counts. For instance, each tile is shifted by a current shift case, and the difference counts in each tile are determined. The difference counts across each individual tile are summed to determine a total difference count for the shift case, and the process is repeated for each shift case, wherein the shift case yielding the fewest total difference counts is selected as an optimal shift for the current pyramid level.

Thereafter, using a difference count threshold, the tiles are ranked based on the number of difference counts they contain and subjected to a pruning process in which only the tiles that contribute to the threshold count (which may represent a percentage of the total difference count) are projected and mapped to the subsequent pyramid level for further processing. The alignment vectors determined at each pyramid level each level are aggregated, and a final alignment vector is determined and used to shift the source image into alignment with the reference image.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
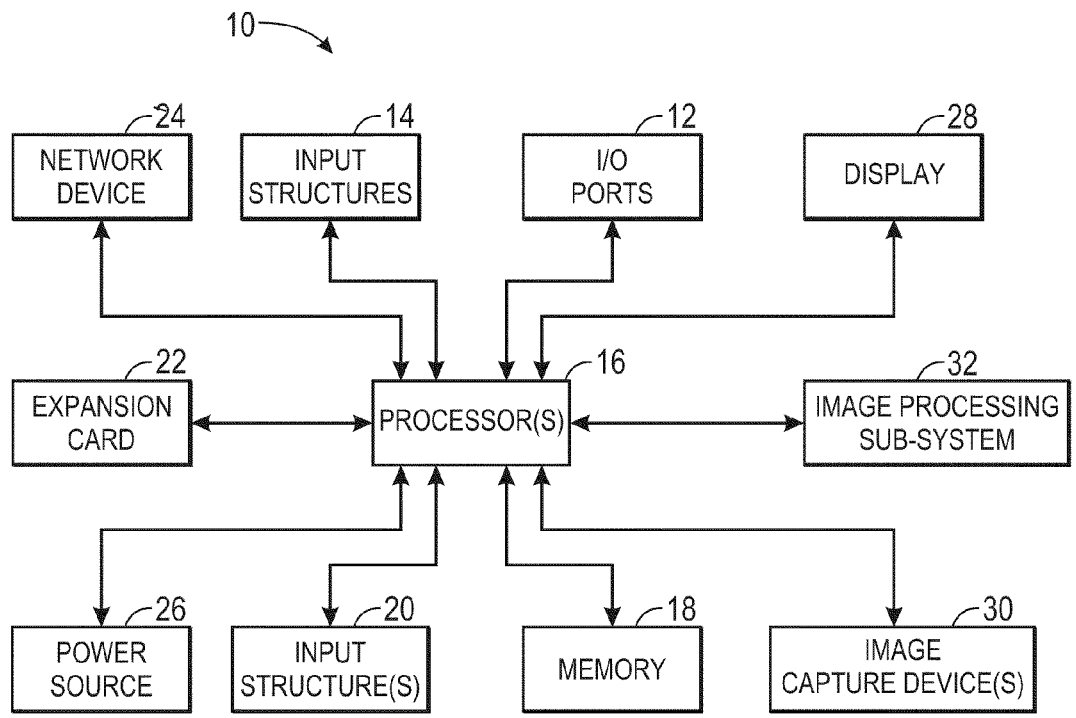
FIG. 1 is a simplified block diagram depicting components of an example of an electronic device that includes an image capture device and an image signal processing subsystem configured to implement an HDR image processing technique in accordance with aspects set forth in the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally provides various techniques for aligning images for HDR image generation using a digital image sensor and for detecting local motion in images captured in quick succession. For instance, as discussed below, certain embodiments relate to techniques for aligning three frames of an image scene taken at different exposures, and then compositing the three frames to produce an HDR image. The three frames may be taken at a low exposure, normal exposure, and high exposure, wherein the normal exposure frame is used as a reference image to which the low exposure and high exposure images (acting as source images) are aligned. In certain embodiments, image pyramids may be generated for the reference and source image, and a difference bitmap may be generated at each level of the pyramid. The difference bitmap is evaluated by tiles, wherein each of nine possible shift cases in the x and y directions {−1, 0, 1} is applied, and the best shift case is selected as an alignment vector for the current pyramid level. Further, a pruning process is applied to the current pyramid level, wherein certain tiles that exhibit fewer or no pixel differences are excluded or disregarded from further processing in subsequent pyramid levels, thus reducing the image area that needs to be processed at each subsequent level pyramid level. Once the base level of the pyramids is reached, a final alignment vector is determined by combining the alignment vector from each pyramid level.

With the foregoing points in mind, FIG. 1 provides a block diagram illustrating an example of an electronic device 10 that may provide for the alignment of digital images, as well as the detection of local motion, in accordance with aspects of the present disclosure. The electronic device 10 may be any type of electronic device, such as a laptop or desktop computer, a mobile phone, a digital media player, or the like, that is configured to receive and process image data, such as data acquired using one or more image capture devices. By way of example only, the electronic device 10 may be a portable electronic device, such as a model of an iPod® or iPhone®, available from Apple Inc. of Cupertino, Calif. Additionally, the electronic device 10 may be a desktop, laptop, or tablet computer, such as a model of a MacBook®, MacBook® Pro, MacBook Air®, iMac®, Mac® Mini, Mac Pro®, or iPad®, also available from Apple Inc. In other embodiments, electronic device 10 may also be a model of an electronic device from another manufacturer that is capable of acquiring and processing image data.

As shown in FIG. 1, the electronic device 10 may include various internal and/or external components which contribute to the function of the device 10. Those of ordinary skill in the art will appreciate that the various functional blocks shown in FIG. 1 may comprise hardware elements (including circuitry), software elements (including computer code stored on a tangible computer-readable medium) or a combination of both hardware and software elements. Further, FIG. 1 is only one example of a particular implementation and is merely intended to illustrate the types of components that may be present in the electronic device 10. For example, in the in the presently illustrated embodiment, the electronic device 10 may include input/output (I/O) ports 12, input structures 14, one or more processors 16, memory device 18, non-volatile storage 20, expansion card(s) 22, networking device 24, power source 26, and display 28. Additionally, the electronic device 10 may include one or more image capture devices 30, such as a digital camera, and an image signal processing (ISP) sub-system 32. As will be discussed further below, the image capture device(s) 30 and the ISP sub-system 32 may operate in conjunction and may be configured implement image processing and alignment techniques for processing image data to generate composite HDR images.

Before continuing, it should be understood that the system block diagram of the electronic device 10 shown in FIG. 1 is intended to be a high-level control diagram depicting various components that may be included in such a device 10. That is, the illustrated connection lines between each individual component shown in FIG. 1 may not necessarily represent paths or directions through which data flows or is transmitted between various components of the device 10, but is merely intended to show that the processor(s) 16 may interface and/or communicate either directly or indirectly with each component of the device 10.

The processor(s) 16 may control the general operation of the device 10. For instance, the processor(s) 16 may provide the processing capability to execute an operating system, programs, user and application interfaces, and any other functions of the electronic device 10. The processor(s) 16 may include one or more microprocessors, such as one or more "general-purpose" microprocessors, one or more special-purpose microprocessors and/or application-specific microprocessors (ASICs), or a combination of such processing components. For example, the processor(s) 16 may include one or more processors based upon x86 or RISC instruction set architectures, as well as dedicated graphics processors (GPU), image signal processors, video processors, audio processors and/or related chip sets. In such embodiments, the processing of image data may be primarily handled by a dedicated image signal processor, which may be implemented as part of the ISP sub-system 32, thus at least partially offloading image processing related tasks from a main processor (CPU). As will be appreciated, the processor(s) 16 may be coupled to one or more data buses for transferring data and instructions between various components of the device 10. In certain embodiments, the processor(s) 16 may provide provide the processing capability to execute an imaging applications on the electronic device 10, such as Photo Booth®, Aperture®, iPhoto®, or Preview®, available from Apple Inc., or the "Camera" and/or "Photo" applications provided by Apple Inc. and available on certain models of the iPhone® and iPod®. In one embodiment, the processor(s) 16 may also provide the capability to execute a video conferencing application on the device 10, such as FaceTime®, available from Apple Inc.

The instructions or data to be processed by the processor(s) 16 may be stored in a computer-readable medium, such as a memory device 18. The memory device 18 may be provided as a volatile memory, such as random access memory (RAM) or as a non-volatile memory, such as read-only memory (ROM), or as a combination of one or more RAM and ROM devices. The memory 18 may store a variety of information and may be used for various purposes. For example, the memory 18 may store firmware for the electronic device 10, such as a basic input/output system (BIOS), an operating system, various programs, applications, or any other routines that may be executed on the electronic device 10, including user interface functions, processor functions, and so forth. In addition, the memory 18 may be used for buffering or caching during operation of the electronic device 10. For instance, in one embodiment, the memory 18 include one or more frame buffers for buffering video data as it is being output to the display 28. In some embodiments, the memory 18 may utilize a direct memory access (DMA) interface communicatively coupling it to the ISP sub-system 32.

In addition to the memory device 18, the electronic device 10 may further include a non-volatile storage 20 for persistent storage of data and/or instructions. The non-volatile storage 20 may include flash memory, a hard drive, or any other optical, magnetic, and/or solid-state storage media, or some combination thereof. Thus, although depicted as a single device in FIG. 1 for purposes of clarity, it should understood that the non-volatile storage device(s) 20 may include a combination of one or more of the above-listed storage devices operating in conjunction with the processor(s) 16. The non-volatile storage 20 may be used to store firmware, data files, image data, software programs and applications, wireless connection information, personal information, user preferences, and any other suitable data. In accordance with aspects of the present disclosure, composite HDR images generated by the ISP sub-system 32 may be stored in 32 may be stored in the non-volatile storage 20 and/or the memory device 18 prior to being output to the display 28.

The display 28 may display various images generated by device 10, such as a graphical user interface (GUI) for an operating system, or image data (including still images and video data) processed by the ISP sub-system 32, including HDR images generated in accordance with the presently disclosed techniques. The display 28 may be any suitable type of display, such as a liquid crystal display (LCD), plasma display, or an organic light emitting diode (OLED) display, for example. In one embodiment, the display may be a high-resolution LCD display having 300 or more pixels per inch, such as a Retina Display®, available from Apple Inc. Further, in some embodiments, the display 28 may be provided in conjunction with the above-discussed touch-sensitive element, such as a touch screen, that may function as one of the input structures 14 for the electronic device 10.

As discussed above, the electronic device 10 may include imaging device(s) 30, which may be provided as a digital camera configured to acquire both still images and moving images (e.g., video). The camera 30 may include a lens and one or more image sensors configured to capture and convert light into electrical signals. By way of example only, the image sensor may include a CMOS image sensor (e.g., a CMOS active-pixel sensor (APS)) or a CCD (charge-coupled device) sensor. Generally, the image sensor in the camera 30 includes an integrated circuit having an array of pixels, wherein each pixel includes a photodetector for sensing light from an image scene. The image sensor may be coupled to the ISP sub-system 32 via a sensor interface, which may utilize a Standard Mobile Imaging Architecture (SMIA) interface or any other suitable serial or parallel image sensor interface, or a combination of such interfaces.

As those skilled in the art will appreciate, the photodetectors in the imaging pixels of the sensor generally detect the intensity of light captured via the camera lenses. However, photodetectors, by themselves, are generally unable to detect the wavelength of the captured light and, thus, are unable to determine color information. Accordingly, the image sensor may further include a color filter array (CFA) that may overlay or be disposed over the pixel array of the the image sensor to capture color information. The color filter array may include an array of small color filters, each of which may overlap a respective pixel of the image sensor and be configured to filter the captured light by wavelength. Thus, when used in conjunction, the color filter array and the image sensor may provide both wavelength and intensity information with regard to light captured through the camera, which may be representative of a captured image.

Figure 2:
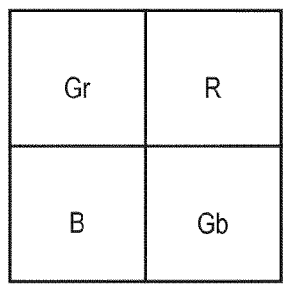
FIG. 2 is a graphical representation of a 2×2 pixel block of a Bayer color filter array that may be implemented in the image capture device of the electronic device of FIG. 1.

In one embodiment, the color filter array may include a Bayer color filter array, which provides a color pattern that is 50% green elements, 25% red elements, and 25% blue elements. FIG. 2 shows a 2×2 pixel block of a Bayer CFA that includes 2 green elements (referred to Gr and Gb), 1 red element (R), and 1 blue element (B). Thus, an image sensor utilizing a Bayer color filter array may provide information regarding the intensity of the light received by the camera 30 at the green, red, and blue wavelengths, whereby each image pixel records only one of the three colors (red, green or blue). This information, which may be referred to as "raw image data," may then be processed using one or more demosaicing techniques to convert the raw image data into a full color image, generally by interpolating a set of red, green, and blue values for each pixel. Such demosaicing techniques may be performed by the ISP sub-system 32.

Figure 3:
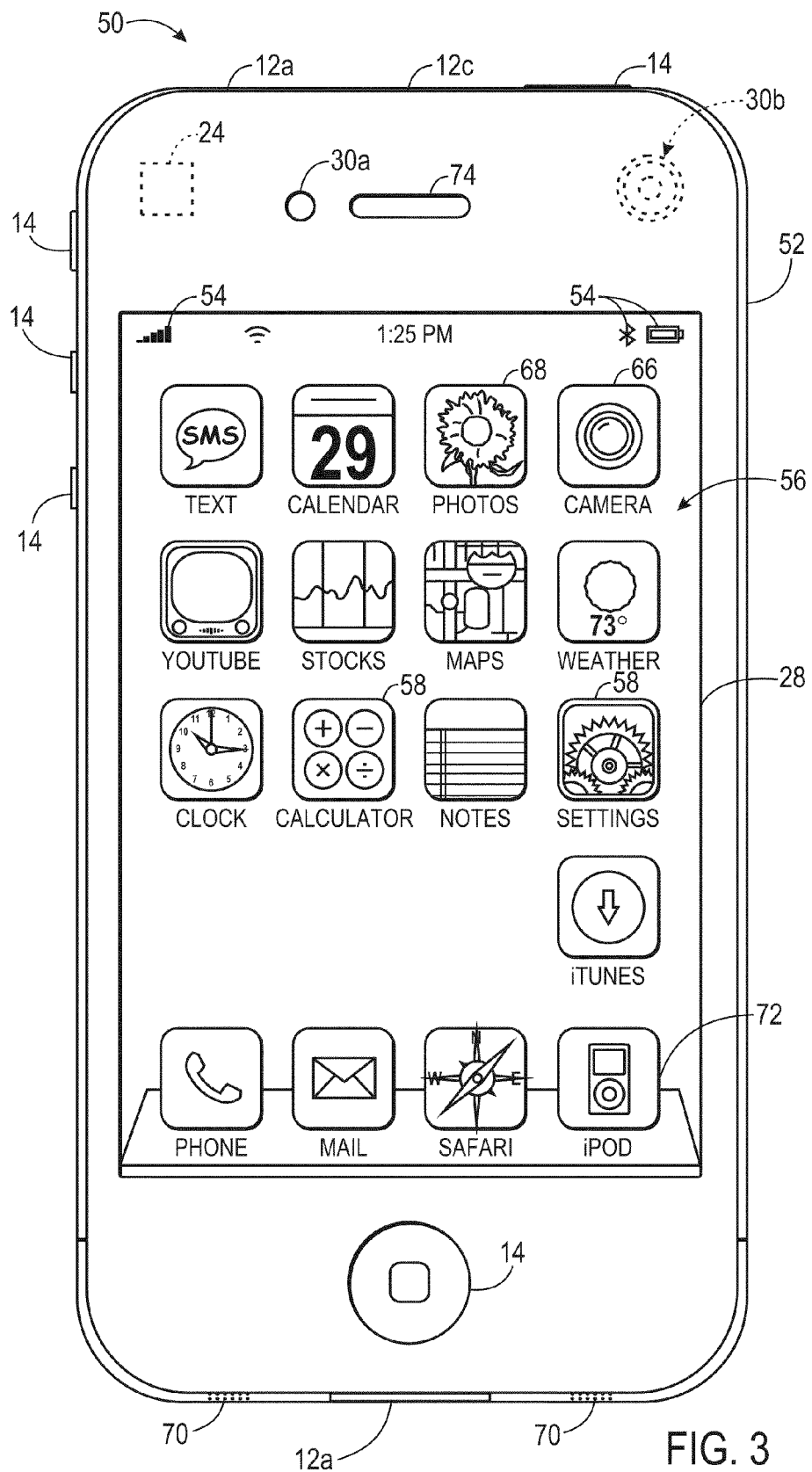
FIG. 3 is a front view of the electronic device of FIG. 1 in the form of a handheld portable electronic device in accordance with aspects of the present disclosure.
Figure 4:
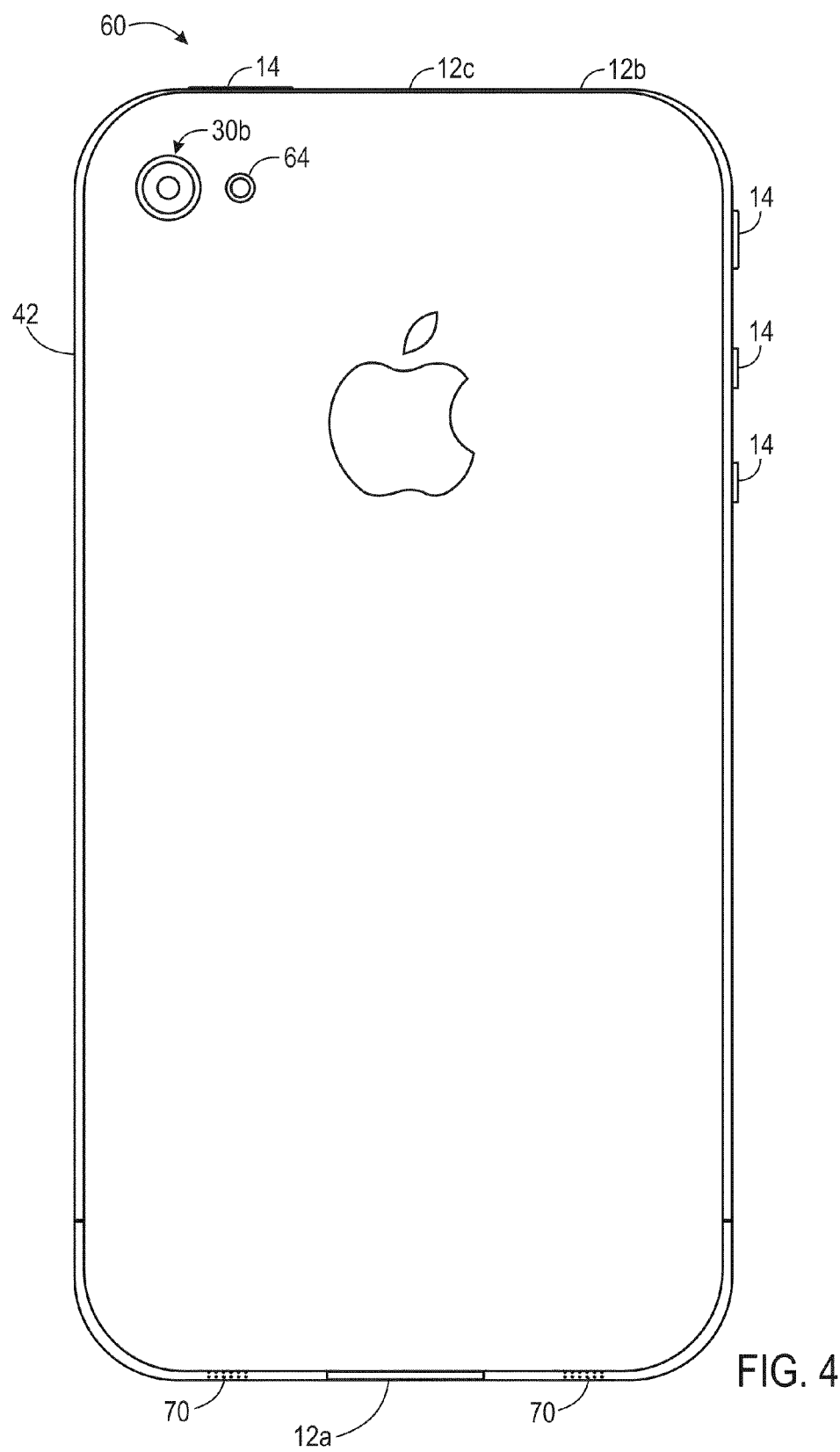
FIG. 4 is a rear view of the handheld electronic device shown in FIG. 3.

Continuing to FIGS. 3 and 4, the electronic device 10 is depicted in the form of a portable handheld electronic device 50, which may be a model of an iPod®, such as an iPod Touch®, or iPhone® available from Apple Inc. The handheld device 50 includes an enclosure 52, which may function to protect the interior components from physical damage and to shield them from electromagnetic interference (EMI). The enclosure 52 may be formed from any suitable material or combination of materials, such as plastic, metal, alloy, or a composite material, and may allow certain frequencies of electromagnetic radiation, such as wireless networking (e.g., 802.11 a/b/g/n networking) and/or telecommunication signals (e.g., GPRS, EDGE, 3G, LTE, etc.), to pass through to wireless communication circuitry (e.g., network device 24), which may be disposed within the enclosure 52, as shown in FIG. 3.

The enclosure 52 also includes various user input structures 14 through which a user may interface with the handheld device 50. For instance, each input structure 14 may be configured to control one or more respective device functions when pressed or actuated. By way of example, one or more of the input structures 14 may be configured to invoke a "home" screen or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that the handheld device 60 may include any number of suitable user input structures existing in various forms including buttons, switches, keys, knobs, scroll wheels, and so forth.

The handheld device 60 may include various I/O ports 12. For instance, the depicted I/O ports 12 may include a proprietary connection port 12a (e.g., a 30-pin dock-connector available from Apple Inc.) for transmitting and receiving data and for charging a power source 26, which may include one or more removable, rechargeable, and/or replaceable batteries. The I/O ports may also include an audio connection port 12b for connecting the device 50 to an audio output device (e.g., headphones or speakers). Further, in embodiments where the handheld device 50 provides mobile phone functionality, the I/O port 12c may be provided for receiving a subscriber identify module (SIM) card (e.g., an expansion card 22).

The display 28, which may be an LCD, OLED, or any suitable type of display, may display various images generated by the handheld device 50. For example, the display 28 may display various system indicators 54 for providing feedback to a user with regard to one or more states of handheld device 50, such as power status, signal strength, external device connections, and so forth. The display 28 may also display a graphical user interface (GUI) 56 that allows a user to interact with the device 50. In certain embodiments, the presently displayed screen image of the GUI 56 may represent a home-screen of an operating system running on the device 50, which may be a version of the Mac OS® or iOS® (previously iPhone OS®) operating systems, available from Apple Inc.

The GUI 56 may include various graphical elements, such as icons 58 that may correspond to various applications that may be opened or executed upon user selection (e.g., receiving a user input corresponding to the selection of a particular icon 58). In some embodiments, the selection of an icon 58 may lead to a hierarchical navigation process, such that selection of an icon 58 leads to a screen or opens another graphical window that includes one or more additional icons or other GUI elements. In the illustrated embodiment, one of the icons 58 may represent a camera application 66 that may be used in conjunction with one or both of a first front-facing camera 30a located on the front side of the device 50 and a second rear-facing camera 30b (shown in phantom lines in FIG. 3) on the rear of the device 50 for acquiring images. Referring briefly to FIG. 4, a rear view of the handheld device 50 is illustrated showing the rear-facing camera 30b as being integrated with the housing 42 and positioned on the rear of the handheld device 50. In the illustrated embodiment, the rear of the handheld device 50 may include a flash module (also referred to as a strobe) 64, which may be used to illuminate an image scene being captured using the rear-facing camera 30b. By way of example, the flash module 64 may include a xenon lighting device and/or a light emitting diode (LED). In one embodiment, the front and rear facing cameras 30a and 30b may be utilized to provide video-conferencing capabilities, such as through the use of a video-conferencing application based upon FaceTime®, available from Apple Inc.

Additionally, the handheld device 50 may include various audio input and output elements. For example, the audio input/output elements 70, may include an input receiver, such as a microphone. Thus, in embodiments where the handheld device 50 includes mobile phone functionality, the input receivers may be configured to receive user audio input, such as a user's voice. Additionally, the audio input/output elements 70 may include one or more output transmitters, which may include one or more speakers that function to transmit audio signals to a user, such as during the playback of music data using a media player application 72. In a mobile phone embodiment, an additional audio output transmitter 74 may be provided, as shown in FIG. 3. Like the output transmitters of the audio input/output elements 70, the output transmitter 74 may also include one or more speakers configured to transmit audio signals to a user, such as voice data received during a telephone call. Thus, in a mobile phone embodiment, the audio input/output elements 70 and 74 may collectively function as the audio receiving and transmitting elements of a telephone.

Having now provided some context with regard to some form factors that the electronic device 10 may take, certain HDR imaging techniques that may be implemented on the electronic device 10 in accordance with embodiments set forth in the present disclosure will now be discussed in further detail. As discussed above, the ISP sub-system 32 may be configured to perform image alignment (also referred to as registration) on multiple images captures in quick succession and to generate a composite HDR image using these multiple images. Additionally, the ISP sub-system 32 may be configured to detect instances in which local motion within the multiple images exceeds a particular threshold that cannot be compensated for using image registration. In such instances, a user may be notified (e.g., by a notification or pop-up message) that an aesthetically pleasing HDR image cannot be generated due to excessive motion within the images.

In one embodiment, the image capture device 30 may initiate an HDR imaging process by acquiring three images of an image scene in quick succession, including one image at a low exposure level (underexposed), one image at a normal exposure level, and one image at a high exposure level (overexposed). Embodiments of the present technique may include processing these three images, which may be temporally offset, for alignment, wherein the low and high exposure images are considered as source images that are to be aligned with the normal exposure image, referred to herein as a reference image. Once aligned, the reference image and the source images may be merged to generate a composite HDR image. As discussed below with reference to FIGS. 5-14, image alignment techniques in accordance with embodiments disclosed herein may offer improvements with regard to overall processing time and efficiency when compared to certain conventional image alignment algorithms, such as the "Ward algorithm," as disclosed by Gregory Ward in Fast, *Robust Image Registration for Compositing High Dynamic Range Photographs from Handheld Exposures* (as published in Journal of Graphics Tools, vol. 8, no. 2 (2003), pp. 17-30), the entirety of which is incorporated by reference. Thus, the image alignment techniques disclosed herein may provide for the alignment of two or more images in not only a lesser amount of time, but also using fewer steps or computing cycles when compared to certain conventional image alignment techniques, such as the Ward algorithm. A discussion of these image alignment techniques is provided below with reference to FIGS. 5-14.

Figure 5:
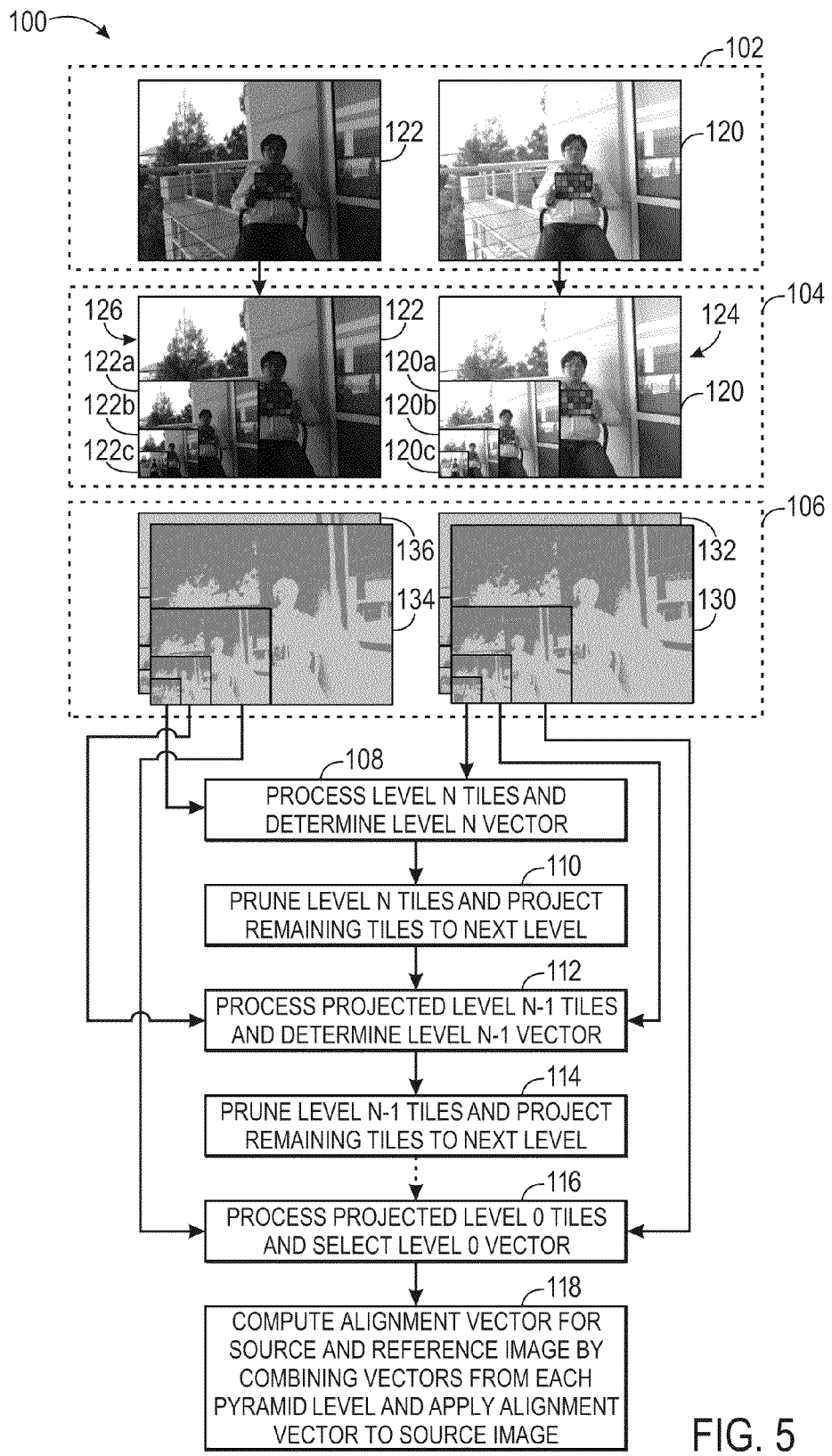
FIG. 5 illustrates a process for aligning a source and reference image by generating respective image pyramids for the source and reference images and determining alignment vectors for each image pyramid level based on a difference bitmap corresponding to the source and reference image, in accordance with one embodiment.

Referring to FIG. 5, a graphical representation of a flow chart that shows a high level operation of an image alignment algorithm 100 that includes blocks 102-118 is illustrated in accordance with an embodiment. The algorithm 100 for performing the image alignment, which is referred herein as "alignment logic," may be part of the ISP sub-system 32 of the electronic device 10. As shown in FIG. 5, the alignment logic 100 begins at block 102 at which two gray level images, namely a reference image 120 and a source image 122 that is to be aligned with respect to the reference image 120, are received as inputs. For instance, the reference image 120 may be the normal exposure image, while the source image 122 may be either of the low or high exposure images. Thus, in an embodiment where a normal exposure image, an underexposed image, and an overexposed image are to be aligned to generate a composite HDR image, the alignment process may involve aligning the underexposed image with the normal exposure image and aligning the overexposed image with the normal exposure image using the alignment logic 100. As can be appreciated, the alignment of the underexposed image and the overexposed image with the normal exposure image (e.g., reference image 120) may occur sequentially or in parallel.

For purposes of example only, the source image 122 shown in FIG. 5 may represent the underexposed image. After receiving the source image 122 and reference image 120 at block 102, the alignment logic 100 proceeds to block 104, wherein image pyramids 124 and 126 are generated for the reference image 120 and the source image 122, respectively, by scaling them recursively by some factor. For instance, in the present embodiment, each of the reference and source images 120, 122 may be scaled recursively by a factor of 2 to generate each level of the image pyramids. For the convention used herein, pyramids having levels 0-$n$ (for n+1 total levels) may be generated, with pyramid level 0 referring to the original base image and pyramid level n being obtained by scaling down the height and width of the original image by a factor of $2^n$. Thus, the bottom of an n+1 level pyramid may refer to the base (the original image size (level 0)) and the top or apex (level n) of the pyramid may correspond to the smallest scaled version of the image. For example, referring to FIG. 5, the image pyramid 124, which is shown as having 4 levels, may have a base level (level 0) corresponding to the reference image 120, a second level 120$a$, a third level 120$b$, and a fourth level 120$c$, with each level including a scaled image derived from the reference image 120, but reduced in size by a factor of two relative to a previous level of previous level of the pyramid 124. The image pyramid 126 may be constructed in a manner similar to the image pyramid 124, but using the source image 122 as the base level and deriving the scaled images 122$a$, 122$b$, and 122$c$.

At block 106, two threshold bitmaps (referred to here as bitmap_a and bitmap_b) are generated for each level of the image pyramids 124 and 126. For instance, the bitmaps 130 and 132 are generated for each level of the image pyramid 124, and the bitmaps 134 and 136 are generated for each level of the image pyramid 126. These may equivalently be considered as four threshold bitmap pyramids, with bitmap pyramids 130 (ref_bitmap_b) and 132 (ref_bitmap_a) corresponding to the reference image pyramid 124, and with bitmap pyramids 134 (src_bitmap_b) and 136 (src_bitmap_a) corresponding to the source image pyramid 126.

For instance, given a current level of the reference pyramid 124 and source pyramid 126, corresponding pairs of two-tone bitmaps (e.g., black and white) may be generated for the scaled image (or original-sized image if the current level is level 0) at the current level of each image pyramid 124, 126. In one embodiment, the bitmap generation process may be performed for each scaled image by generating a respective gray level image histogram based for each scaled image. Then, for each scaled image, a first bitmap (bitmap_a) may be generated by comparing the gray level value (e.g., may have range of 0-255 for 8-bit data) of each pixel of a scaled image against a selected threshold of the histogram, and binning each pixel to a value of 1 (corresponding to white) if the pixel value is greater than the threshold and 0 (corresponding to black) if the pixel value is less than the threshold. A second bitmap (bitmap_b) may be generated for each scaled image by comparing the gray level value of each pixel against the threshold, and binning the pixel in an opposite manner, i.e., binning to 1 if the pixel value is less than the threshold and 0 if the pixel value is greater than the threshold. As discussed below, the threshold may be a percentile of the histogram values, and may be determined depending on the brightness of the image. This bitmap generation process will be discussed in more detail below with reference to FIG. 6.

Further, though shown as occurring in block 106 in FIG. 5, it should be understood that all levels of the bitmap pyramids 130, 132, 134, and 136 need not necessarily be generated at once. For instance, as discussed below, alternate stages of alignment and pruning may be performed for each pyramid level. Thus, in some embodiments, rather than generating all the bitmaps ahead of the alignment and pruning steps 108-116, the bitmaps may be generated at the start of the alignment and pruning process for each level, as needed, rather than batching these tasks all at block 106.

The alignment and pruning process, which is depicted by blocks 108-116 in FIG. 5, may begin by processing the smallest bitmaps (level n) and working up towards the base level (level 0). For instance, beginning with block 108, the level n bitmaps may be processed to determine a best-case alignment vector component. In one embodiment, the alignment process may first include generating a difference bitmap by combining the four bitmaps (e.g., two bitmaps for the level n source image and two bitmaps for the level n reference image) corresponding to level n to generate a difference bitmap. The difference bitmap for level n is divided into tiles (e.g., which may be 32×32 pixels in one embodiment, but could have another other desired dimensions in other embodiments), and the alignment logic 100 may search for the best alignment for each tile by considering nine possible cases (listed below) that arise when a source tile is shifted in by −1, 0 or 1 pixels in the x and y directions:

Shift Cases

| X, Y | |
|---|---|
| (0, 0) | no shift |
| (0, 1) | shift one pixel in +y-direction |
| (0, −1) | shift one pixel in −y-direction |
| (1, 0) | shift one pixel in +x-direction |
| (−1, 0) | shift one pixel in −x-direction |
| (1, 1) | shift one pixel in both +x- and +y-directions |
| (1, −1) | shift one pixel in both +x- and −y-directions |
| (−1, 1) | shift one pixel in both −x- and +y-directions |
| (−1, −1) | shift one pixel in both −x- and −y-directions |

Thus, for each level, nine total difference counts are produced for each tile, each corresponding to a respective one of the above-listed shift cases. The difference counts for each tile for each shift case are summed to determine a total difference count for each of the nine shift cases. Thus, at block 108, nine total difference counts are determined for the level n difference bitmap based upon the nine shift cases. An alignment vector component for the current level, here level n, is then determined based upon the optimal shift case for the current level, which may be selected as the pair (sx, sy) that minimizes the total number of differences across all tiles of the current level. An example depicting the determination of an optimal shift case for a pyramid level is described in more detail below with reference to FIGS. 8-9.

Once the alignment vector component for level n is determined at block 108, the alignment logic proceeds to block 110 at which the tiles of the level n difference bitmap are pruned. As discussed above, pruning may refer to the process of analyzing and identifying a subset of tiles that represent portions of an image in one pyramid level that exhibit little to no motion and excluding image areas represented by this subset of tiles from being processed during the alignment of subsequent levels. In one embodiment, this subset may be found by analyzing the difference counts for each tile based on the selected optimal shift case. For example, the tiles may be ranked in descending order based upon their respective difference counts (e.g., the tile with the most difference counts may be first, and the tile with the fewest difference counts may be last), and the top tiles that meet a difference count threshold corresponding to a particular percentage of the total difference count for the current level are the carried over or "projected" into the next pyramid level, while those that lie outside of the difference count threshold are "pruned" or excluded from further analysis. An example of such a pruning process will be explained in further detail below with reference to FIGS. 10-11.

Thereafter, the alignment and pruning steps may repeat for each level of the image pyramids 124 and 126 until the base levels (e.g., the reference image 120 and source image 122) are reached. For instance, after the level n difference bitmap is processed for determination of an alignment vector component and pruned, the unpruned tiles are projected to the next level, level n−1, and the alignment and pruning steps are repeated for a difference bitmap corresponding to level n−1 at blocks 112 and 114, respectively. It should be noted however, that due to the pruning process applied to the tiles of the level n difference bitmap, the alignment and pruning process for level n−1 is applied only to tiles that correspond to the unpruned tiles from level n (the previous level). For instance, the unpruned tiles from level n are projected or mapped to corresponding tiles in the level n−1 difference bitmap, and the alignment and pruning process for level n−1 considers only this subset of tiles, referred to as "active tiles," which define an active area of the area of the level n−1 difference bitmap. Thus, for a top-most level, an active area may be considered as the entire difference bitmap (e.g., all tiles).

The active tiles of level n−1 are then processed at block 112 to determine an optimal alignment vector component (based on the best shift case) and then pruned again at block 114. The unpruned tiles of level n−1 are then projected to the next level, level n−2. Thus, as will be appreciated, one reason for the improved efficiency of the alignment logic 100 when compared to certain conventional image alignment algorithms, such as the Ward algorithm, is attributable to the fact that each subsequent level processes a smaller area of the difference bitmap due to the fact that certain portions of the image have been pruned during the processing of previous levels. For instance, in level n−2, the active tiles would exclude regions of the difference bitmap that have already been pruned from level n−1 and level n. In contrast, the Ward algorithm operates on the entire image for each pyramid level, and may thus require substantially more computing cycles and processing time.

As shown in FIG. 5, the alignment and pruning process described with reference to levels n and n−1 may be performed on the difference bitmaps for each subsequent pyramid level, which each subsequent level processing a smaller portion of its corresponding difference bitmap due to the pruning process applied to the previous level. This alignment and pruning process may continue until the base level (level 0) is reached, as indicated at block 116. The alignment process may be performed on the active tiles of the difference bitmap for level 0 to determine the optimal shift case for level 0. It should be noted that the active tiles of level 0 need not be pruned, as level 0 is already the base level (e.g., there is not a subsequent level to which unpruned tiles may be projected).

Next, as indicated at block 118, a final alignment vector may be computed based on the component alignment vectors determined at each pyramid level. In one embodiment, considering that each level incrementally shifts the source image and that each level is twice the dimensions of the preceding level, the alignment vector for a given level l may be expressed as follows:

$$(dx_l, dy_l) = (2dx_{l+1} + sx_l, 2dx_{l+1} + sy_l), \quad (1)$$

wherein ($dx_l$, $dy_l$) represent the x and y components of the vector component for level l, wherein $sx_l$ and $sy_l$ represent the optimal shift in the x- and y-directions (e.g., 0, 1, or −1), and wherein $dx_{l+1}$ and $dx_{l+1}$ represent the x and y components of an aggregate shift vector corresponding to the previous level l+1. Thus, as will be appreciated ($dx_{l+1}$, $dx_{l+1}$) represents a vector sum of the alignment vector components from each of the levels preceding level l. At level l the components $dx_{l+1}$ and $dx_{l+1}$ are each multiplied by a factor of 2 to take into account that level l is twice the dimensions of level l+1, and the shift components $sx_l$ and $sy_l$ are added to $2dx_{l+1}$ and $2dx_{l+1}$, respectively. This process may be repeated until level l corresponds to the base level 0, at which point the vector ($dx_0$, $dy_0$) will represent the optimal alignment vector for aligning the source image 122 and the reference image 120.

Further, while the logic 100 of FIG. 5 shows the computation of the alignment vector as occurring at block 118, it should be appreciated that in certain embodiments, the alignment vector may be determined in an iterative manner at each level (throughout blocks 108-116) by incrementally adding the alignment vector component for the current level to the aggregate alignment vector for all previous pyramid levels. Thus, the final optimal alignment vector may be determined by adding the level 0 vector component determined at block 116 to the aggregate alignment vector representative of the vector components determined for all pyramid levels prior to level 0.

As discussed above, the present example may represent the alignment of two images for an HDR imaging process, where the reference image 100 may represent a normal exposure image and the source image 122 represents an underexposed image. Accordingly, the alignment process represented by the logic 100 may be repeated to align an overexposed image (as another source image 122) with the reference image 120. As will be appreciated, the alignment of the overexposed image and the underexposed image with the normal exposure image (reference image 120) may occur sequentially or in parallel. Additionally, in certain embodiments, the entire difference bitmaps for a current pyramid level need not necessarily be generated. For instance, rather than generating the entire difference bitmap, some embodiments may generate only the portions of the different bitmap that correspond to the tiles projected from the previous level to the current level. In other words, the difference bitmap need not necessarily be fully constructed, as only the active tiles (e.g., those projected from the previous level) of the difference bitmap need to be created.

Moreover, it should be understood that the alignment logic 100 of FIG. 5 depicts four-level image pyramids merely as a simplified example of the present technique. In practice, the image pyramids may have greater than four levels depending on the pixel resolution of the original base images. For instance, since each preceding pyramid level is scaled down by a factor of two, as the resolution of the base image increases, the number of levels in the image pyramids may also increase. Further, it may be appreciated that while the pruning of the tiles of the upper-most levels (e.g., smallest levels) of the image pyramids may provide the largest net gains in computation speed and efficiency, it may come at the cost of increases in alignment error, since the tiles pruned at the upper levels represent larger areas of the base images (e.g., reference image 120 and source image 122). Thus, while FIG. 5 depicts the pruning process as occurring for each level in logic 100, it should be understood that the pruning process may be bypassed for the smallest few levels of the pyramid in certain embodiments. For example, pruning may be initialized and begin once the third or fourth level from the base of the pyramid is reached, and where the number of pixels start becoming greater.

Figure 6:
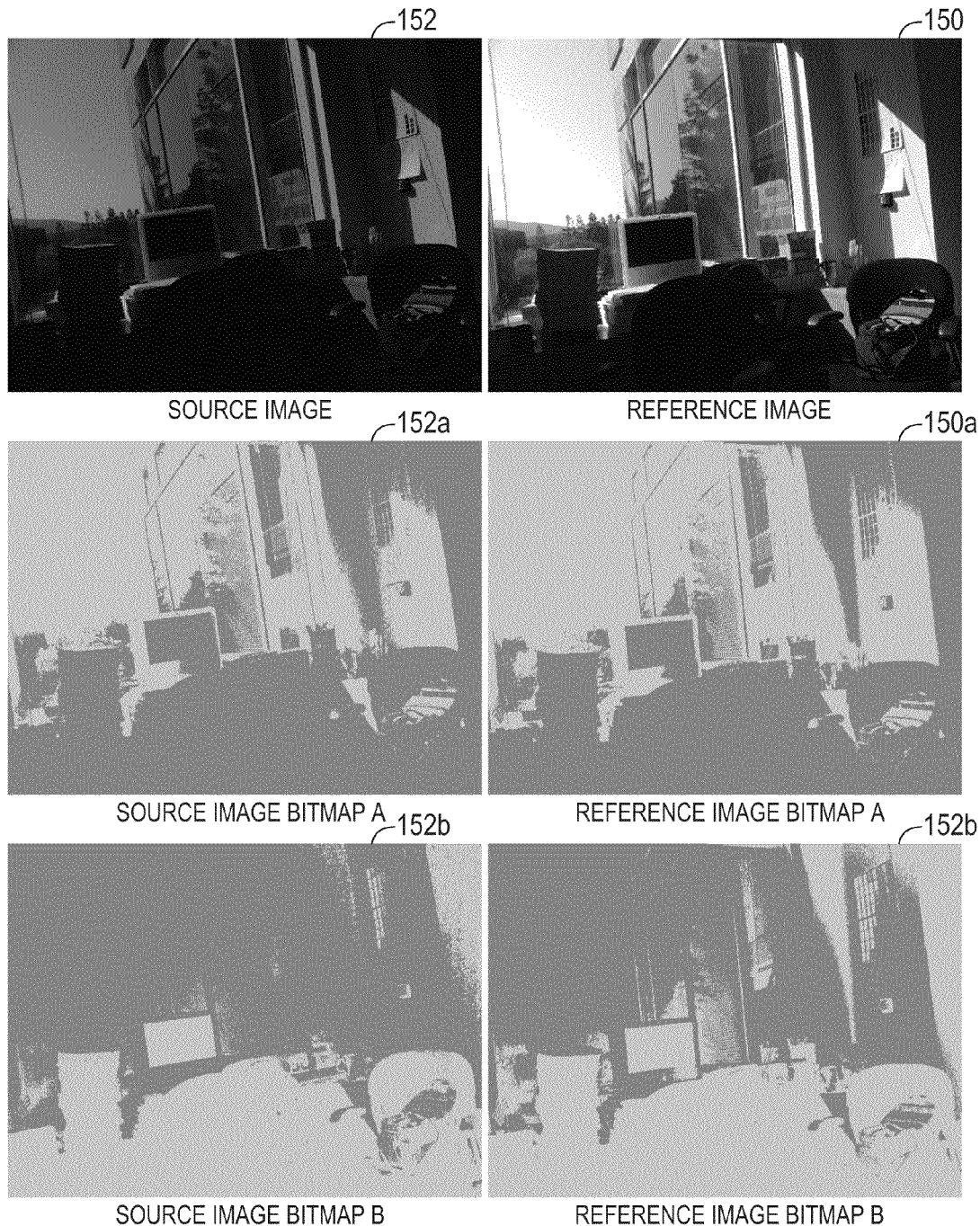
FIG. 6 illustrates, for each of the source and reference images, the generation of bitmaps that may be used during the image alignment process of FIG. 5.

The generation of the bitmaps (e.g., 130, 132, 134, 136) will be now described in further detail. Referring to FIG. 6, two poorly aligned consecutive image frames 150 and 152 of the same image scene are provided at two difference exposure settings for HDR image capture purposes. For instance, the image frame 150 may represent the image scene at a normal exposure level, and the image frame 152 may represent the image scene at a low exposure level (underexposed). Thus, referring to the alignment logic 100 of FIG. 5, the image 150 may be considered as a reference image, and the image 152 may be considered a source image. As can be appreciated, the illustrated example of the images 150 and 152 in FIG. 6 is intended to provide a pathological example in the sense that the frames 150 and 152 differ by noticeable translation as well as some degree of rotation.

As shown, below each of the images 150 and 152 are two corresponding bitmaps. For instance, bitmaps 150a and 150b may correspond to the reference image 150, and bitmaps 152a and 152b may correspond to the source image 152. As discussed above, the bitmaps may be generated based upon a gray level histogram of its base image (either reference image 150 or source image 152). Each bitmap may include 1-bit per pixel, which may be determined by comparing the gray level of the corresponding pixel of the base image against a gray level threshold, which may be a percentile based on the histogram values. For instance, the two bitmaps 150a (referred to as bitmap_a) and 150b (referred to as bitmap_b) for the reference image 150 may be determined using the following logic:

```
//for generating bitmap_a:
if (P > th + c)
   bit _a = 1;
else bit_a = 0;
//for generating bitmap_b:
if (P < th − c)
   bit _b = 1;
else bit_b = 0;
``` wherein, th represents the selected threshold, P represents a current pixel of the reference image 150, bit_a is the pixel of bitmap_a 150a that corresponds to pixel P of the reference image 150, and bit_b is the pixel of bitmap_b 150b that corresponds to pixel P of the reference image 150. In the present embodiment, the value "c" represents a small constant that may provide noise immunity. In one embodiment, c may have a value equal to approximately 4. As discussed above, the threshold (th) may be selected depending upon the brightness of the base image (e.g., reference image 150 for bitmaps 150a and 150b). For example, in one embodiment, the threshold (th) may represent a lower percentile (e.g., 17th percentile), a median percentile, or an upper percentile (e.g., 83rd percentile) depending on whether the luminance (e.g., brightness) of the base image is dark, normal, or very bright, respectively. Further, it should be understood that the bitmaps 152a and 152b corresponding to the source image 152 may be generated in a similar manner.

The bitmaps (bitmap_a and bitmap_b) for each base image may be referred in the present disclosure as "inverse bitmaps," although it should be understood that bitmap_a and the bitmap_b may not necessarily be strict inverses with respect to each other due to an excluded middle set of values. However, they may appear to be approximate inverses of one another to an observer. Further, while the bitmaps normally may be two-tone (e.g., black and white) based upon the binning processed described above, the bitmaps 150a, 150b, 152a, and 152b have been enhanced in FIG. 6 by scaling by 0.25 and adding 0.5 (where 1.0 is represents white) to make them easier to view (e.g., gives the appearance of a grayscale image). This bitmap generation process may be used to generate bitmap_a and bitmap_b for each pyramid level during the alignment process depicted in FIG. 5.

Figure 7:
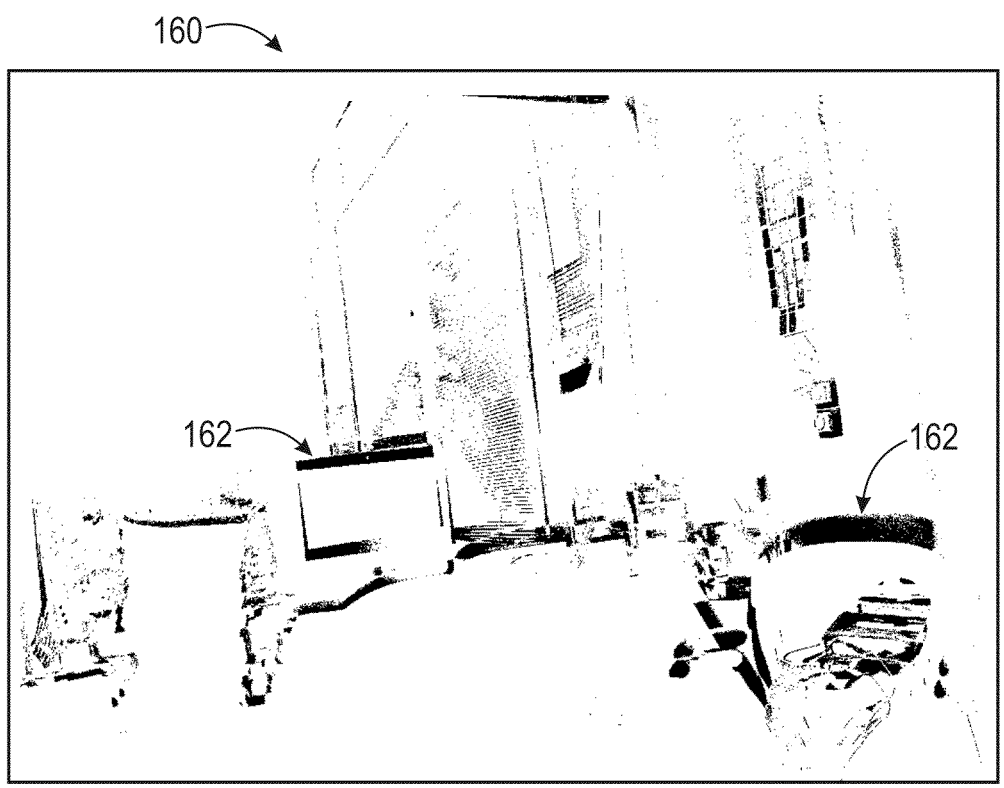
FIG. 7 shows a difference bitmap that may be generated from the individual bitmaps of FIG. 6, in accordance with one embodiment, wherein the difference bitmap indicates areas in which pixel differences between the source and reference image are present.

Referring now to FIG. 7, the four bitmaps (150a, 150b, 152a, 152b) shown in FIG. 5 may be combined to generate a difference bitmap 160. As shown in FIG. 7, the dark areas (e.g., 162) within the difference bitmap 160 may correspond to differences between the threshold frames (e.g. reference frame 150 and source frame 152) and light areas correspond to relatively uniform regions where differences are hard to detect. In one embodiment, the difference bitmap 160 is generated based on the bitmaps 150a, 150b, 152a, and 152b using the following logic:

$$\text{diff} = (r\_bitmap\_a \;\&\; s\_bitmap\_b) | (r\_bitmap\_b \;\&\; s\_bitmap\_a) \qquad (2)$$

wherein diff is the difference bitmap, r_bitmap_a and r_bitmap_b represent the bitmaps (150a, 150b) of the reference image 150, s_bitmap_a and s_bitmap_b represent the bitmaps (152a, 152b) of the source image 152, and the "&" and "|" operators represent Boolean logic AND and OR operations, respectively. It should be noted that this technique for difference bitmap generation differs from the Ward algorithm, which instead uses two predicates to compute a threshold bitmap and an exclusion bitmap (using XOR logic).

As can be seen, even in this pathological example case, the vast majority of the difference bitmap 160 is empty, i.e., has little to no differences. Thus, as generally described above with reference to the pruning process performed by the alignment logic 100 of FIG. 5, the presently disclosed techniques may identify and avoid processing the empty regions (e.g., the pruning process described above in FIG. 5), thus speeding up the process considerably in the average case and increasing overall computing efficiency when compared to certain conventional alignment techniques like the Ward algorithm. For instance, the processing of the top level (level top level (level n) of the pyramid is the least computationally expensive step. By way of example, for an image having a resolution of 2592'1936 pixels and a 6-level pyramid, the smallest level would be 81×60 pixels, which may be covered by 3×2 tiles of 32×32 pixels. During the alignment operation, the tiled processing technique produces a difference count data structure that can be considered a heat map of how the differences in the image are distributed across the tiles. The pruning process may, for each level, filter the difference map to determine the tiles responsible for the majority percentage (e.g., approximately 80 to 85 percent in one embodiment) of the total pixel difference count for a current level, and exclude the remaining tiles from further processing in subsequent pyramid levels.

Figure 8:
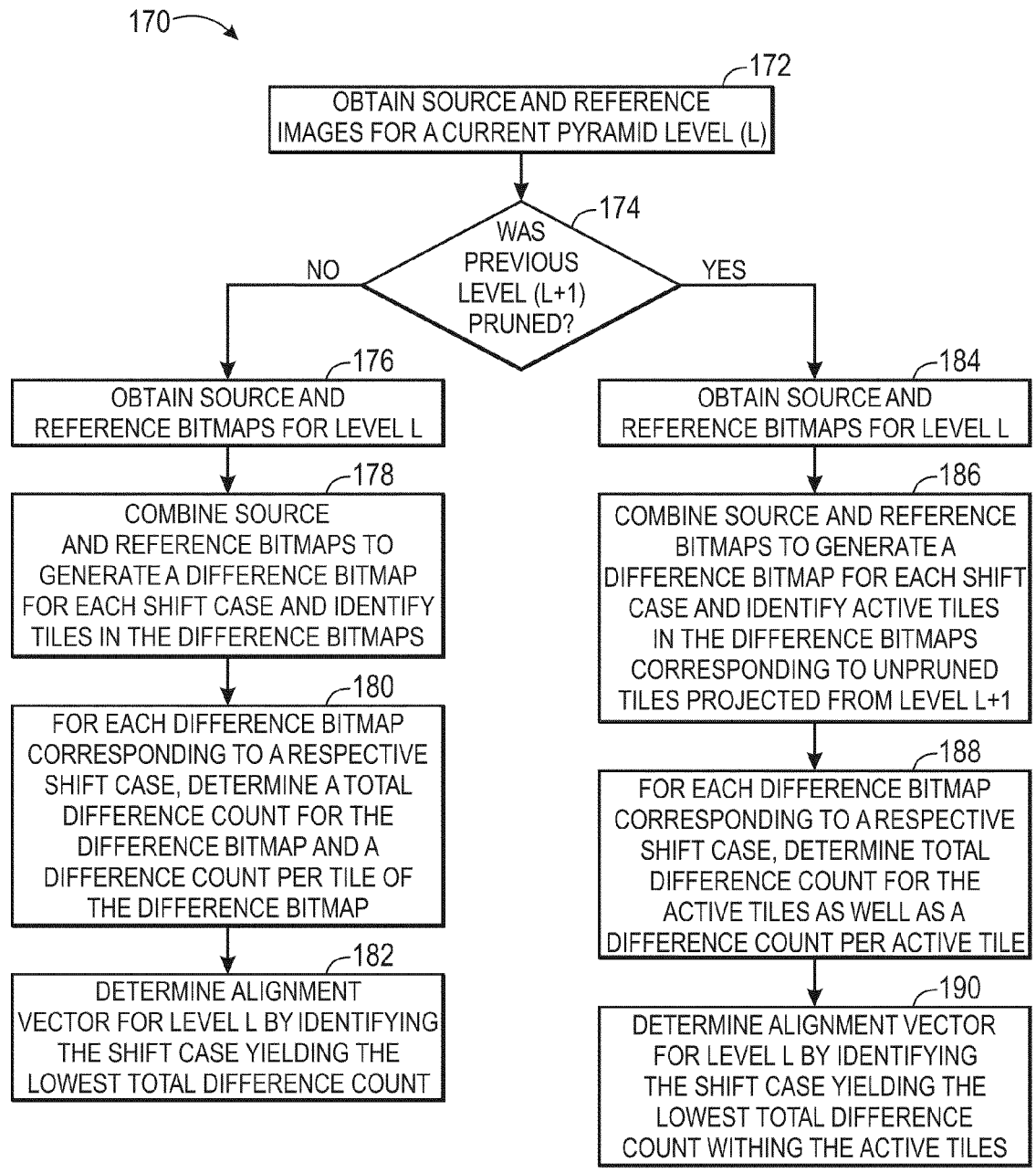
FIG. 8 is a flow chart depicting a process for determining an alignment vector for a particular level of the image pyramid of FIG. 5, in accordance with one embodiment.
Figure 9:
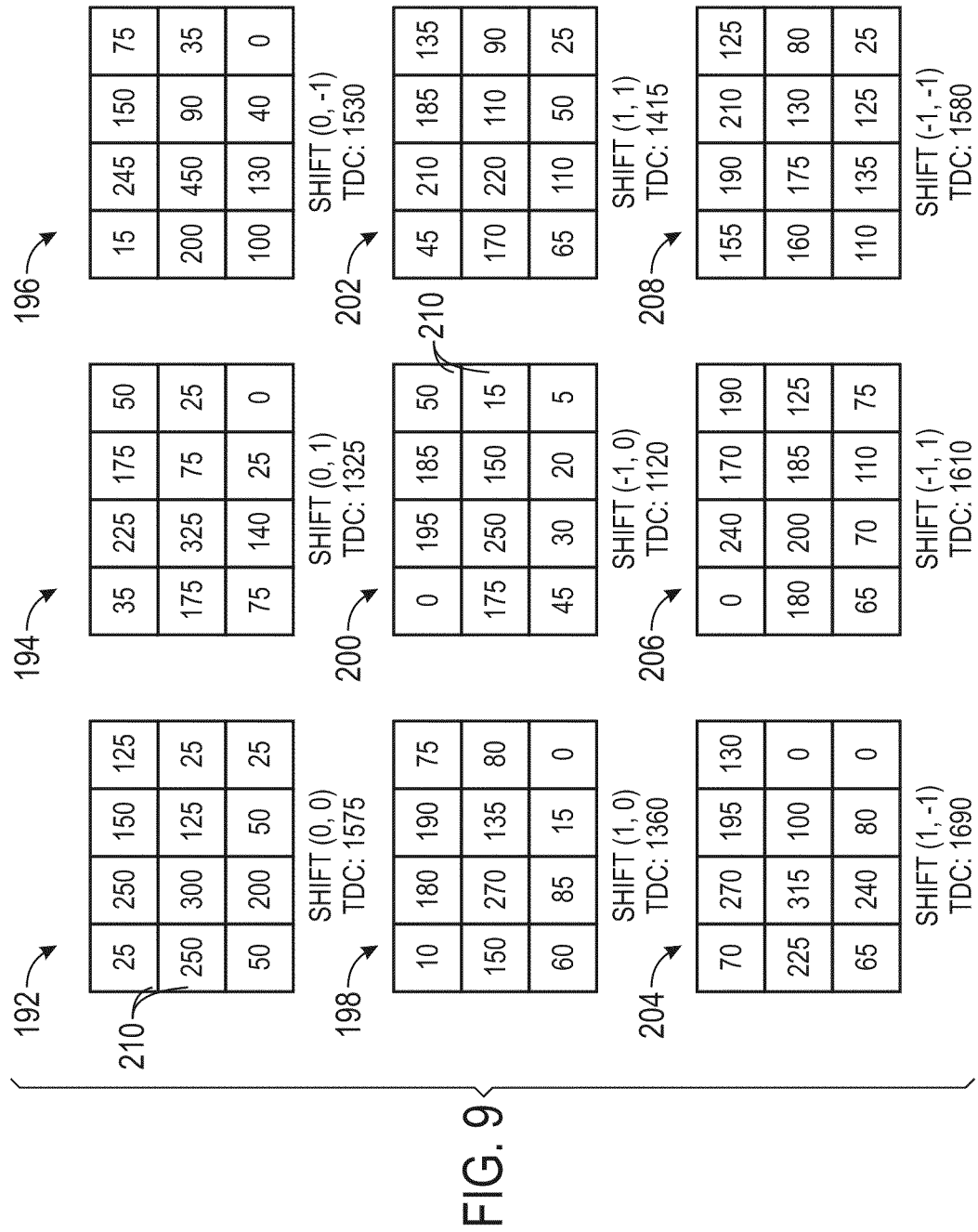
FIG. 9 is an illustrative example depicting the determining of an optimal shift and corresponding alignment vector for a current pyramid level in accordance with the process shown in FIG. 8.
Figure 10:
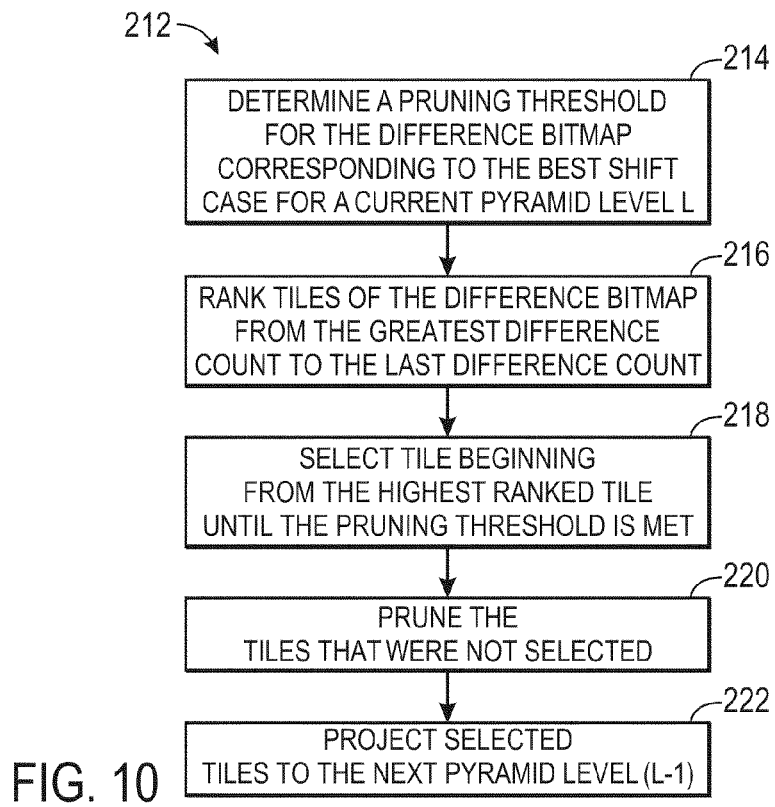
FIG. 10 is a flow chart depicting a process for pruning the difference bitmap for a particular level of the image pyramid of FIG. 5, in accordance with one embodiment.
Figure 11:
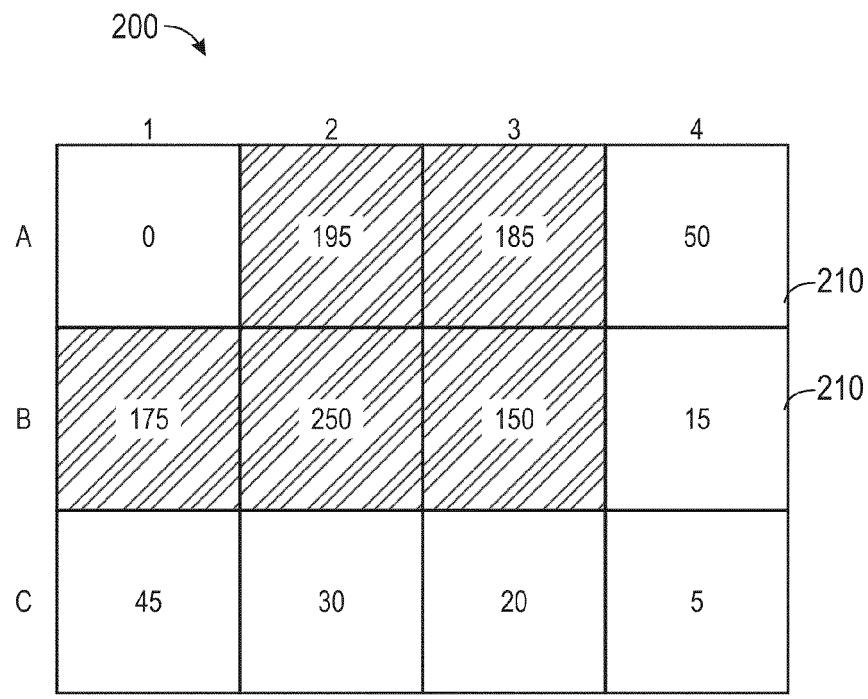
FIG. 11 is an illustrative example depicting how tiles may be pruned from a difference bitmap in a current pyramid level in accordance with the process shown in FIG. 10.

The alignment steps (e.g., block 108, 112) discussed above in FIG. 5 are now described in more detail in FIGS. 8 and 9. Specifically, FIG. 8 is a flow chart showing a process 170 that depicts how the alignment step may be performed for a pyramid level, and FIG. 9 provides an illustrative example of how an optimal shift case may be determined for a current pyramid level. Referring first to FIG. 8, the process 170 begins at block 172 where a source image and a reference image for a current pyramid level, L, are obtained. As discussed above, the source image may be an overexposed image or an underexposed image that is to be aligned with a normal exposure image (the reference image) for HDR imaging purposes. Next, at decision logic 174, a determination is made as to whether the previous level, L+1, was subjected to the pruning process. If the previous level was not pruned (e.g., Level L is the pyramid apex or pruning was bypassed on Level L+1), the process 170 may proceed to blocks 176-182, where all tiles of the corresponding difference bitmap for level L are considered.

At block 176, the reference bitmaps (e.g., r_bitmap_a, r_bitmap_b) and source bitmaps (e.g., s_bitmap_a, s_bitmap_b) are generated for the level L source and reference images. This step may be performed using the bitmap generation process discussed above with reference to FIG. 6. Next, at block 178, the source and reference bitmaps are combined to produce a difference bitmap for each of the nine possible shift cases for level L. The difference bitmaps are also partitioned into tiles for the alignment and pruning processing. In one embodiment, the difference bitmap may be generated using the process described above in Equation 2, and the tiles may have a size of 32×32 pixels.

Next, at block 180, a difference counts are determined for the entire bitmap, as well as for each individual tile, in each of the nine shift cases. For instance, to obtain the total difference count, each individual tile may be shifted based on each shift case and, for each shift case, the respective difference count for each tile may be summed to obtain the total difference count for a particular shift case. As discussed in further detail below, this allows the present technique to rely on the shifting of single words (e.g., 32 bit words) rather than shifting entire bitmaps, as is performed in the Ward algorithm. Then, at block 182, the level L alignment vector, which will contribute to the final alignment vector (e.g., at the base level 0) is determined based on the shift case that yields the lowest total difference count. As discussed further below in FIG. 10, subsequent to block 182, the pruning process may be applied to the tiles of the difference bitmap corresponding to the best shift case.

Returning to decision logic 174, if the previous level L+1 was pruned, then only the active tiles of level L (corresponding to the unpruned tiles from the previous level L+1) are considered in level L. For instance, blocks 184 and 186 of the process 170 may be generally identical to blocks 176 and 178, respectively, except only the active tiles (rather than all tiles) are considered at block 186. Thus, at block 188, all possible shift cases are considered, but with a total difference count of only the active tiles for level L being considered. Similar to block 178, the total difference counts across the active tiles may be determined for each shift case by summing the individual difference counts for each active tile for each shift case. Then, at block 190, the level L alignment vector is determined based on the shift case that yields the lowest total difference count across the active tiles.

An example of the process of determining an optimal shift case for level L is illustrated in FIG. 9. In the illustrated example, the difference bitmaps of level L may include 12 tiles, referred to by reference number 210. As shown, each of the nine shift cases is illustrated in FIG. 9. For instance, the shift case (0,0) (representing no shift) is represented by the difference bitmap 192. The numbers shown in each tile 210 of the difference bitmap 192 represents the different counts within that particular tile 210 based on a shift of (0,0). Thus, as shown, when the shift case (0,0) is applied, the tiles 210 have individual difference counts of 25, 250, 150, 125, 250, 300, 125, 25, 50, 200, 50, and 25 which, when summed, provide a total difference count of count of 1575 for the difference bitmap 192. Similarly, the difference bitmaps 194-208 represent the other eight shift cases: (0,1), (0,−1), (1,0), (−1,0), (1,1), (1,−1), (−1,1), and (−1,−1), respectively. The total difference counts (TDC), as well as respective individual difference counts for each tile, are shown for each of the shift cases. For instance, the difference bitmap 194 (representing a shift of (0,1)) has a total difference count of 1325, the difference bitmap 196 (representing a shift of (0,−1)) has a total difference count of 1530, and so forth.

As discussed above, the shift case that yields the lowest difference count across all tiles for the current level L (or all active tiles if the previously level was pruned), is selected as the alignment vector for level L. Thus, in the example provided in FIG. 9, the shift case represented in difference bitmap 200 (representing a shift of (−1, 0)) yields the lowest total difference count (1120 pixel differences) of the nine illustrated cases. Thus, the level L alignment vector $(dx_L, dy_L)$ may be (−1,0) in the present example, i.e., a shift of −1 in the x-direction and no shift in the y-direction.

Thus, having determined the best alignment vector for level L, the pruning process described above may be applied to the difference bitmap 200, which represents the best shift case for level L in this example. An example of the pruning process will now be described in more detail with reference to both FIGS. 10 and 11. For instance, referring to FIG. 10, a process 212 for pruning the tiles 210 of the difference bitmap (e.g., difference bitmap 200) corresponding to the selected optimal shift for level L. As may be appreciated, the process 212 may occur subsequent to blocks 182 or 190 of the process 170 in FIG. 8. The process 212 begins at block 214 at which a pruning threshold is first determined for the selected difference bitmap 200. For instance, the pruning threshold may represent a percentage of the total difference count corresponding to the selected difference bitmap 200. In one embodiment, the pruning threshold may be set to approximately 85 percent of the total difference count. Thus, for the difference bitmap 200, the pruning threshold may be calculated as 85 percent of the total difference count 1120, which is equivalent to approximately 952 difference counts.

Next, at block 216, the individual tiles of the selected difference bitmap 200 are ranked in order from the tile having the greatest number of difference counts. Thus referring to FIG. 11, the tiles 210 of the difference bitmap 200 may be ranked in the following order–B2, A2, A3, B1, B3, A4, C1, C2, C3, B4, C4, A1—wherein tile B2 has the greatest number of difference counts (250) and tile A1 has the least number of difference counts (0). Subsequently, at block 218, tiles are selected in order beginning from the first ranked tile (B2) until the pruning threshold is met. For instance, in the example shown in FIG. 11, the tiles B2, A2, A3, B1, and B3 collectively contribute a total of 955 difference counts, which meets the pruning threshold. Thereafter, the tiles that were not selected at block 218, namely tiles A4, C1, C2, C3, B4, C4, and A1, are pruned at block 220, and the image areas corresponding to the pruned tiles will not be processed in the subsequent pyramid level L−1. Finally, at block 222, the selected tiles (B2, A2, A3, B1, and B3) are projected to the next pyramid level L−1, and the alignment and pruning process may be repeated. For example, the alignment and pruning process may be repeated at each level of the pyramid until the base level (level 0, the original image size) is reached. As discussed above, in some embodiments, pruning may be bypassed for some levels of the pyramid (e.g., the top-most 3-4 levels) and is not necessary at the base level. In practice, for natural image scenes, it is not uncommon that as much as 75 percent of the tiles may get eliminated at each pyramid level, which may correspond to significantly faster processing of successive image levels (which may have 4 times as many pixels as their immediate predecessors based on a scaling factor of 2) by reducing the image area that needs to be processed.

Figure 12:
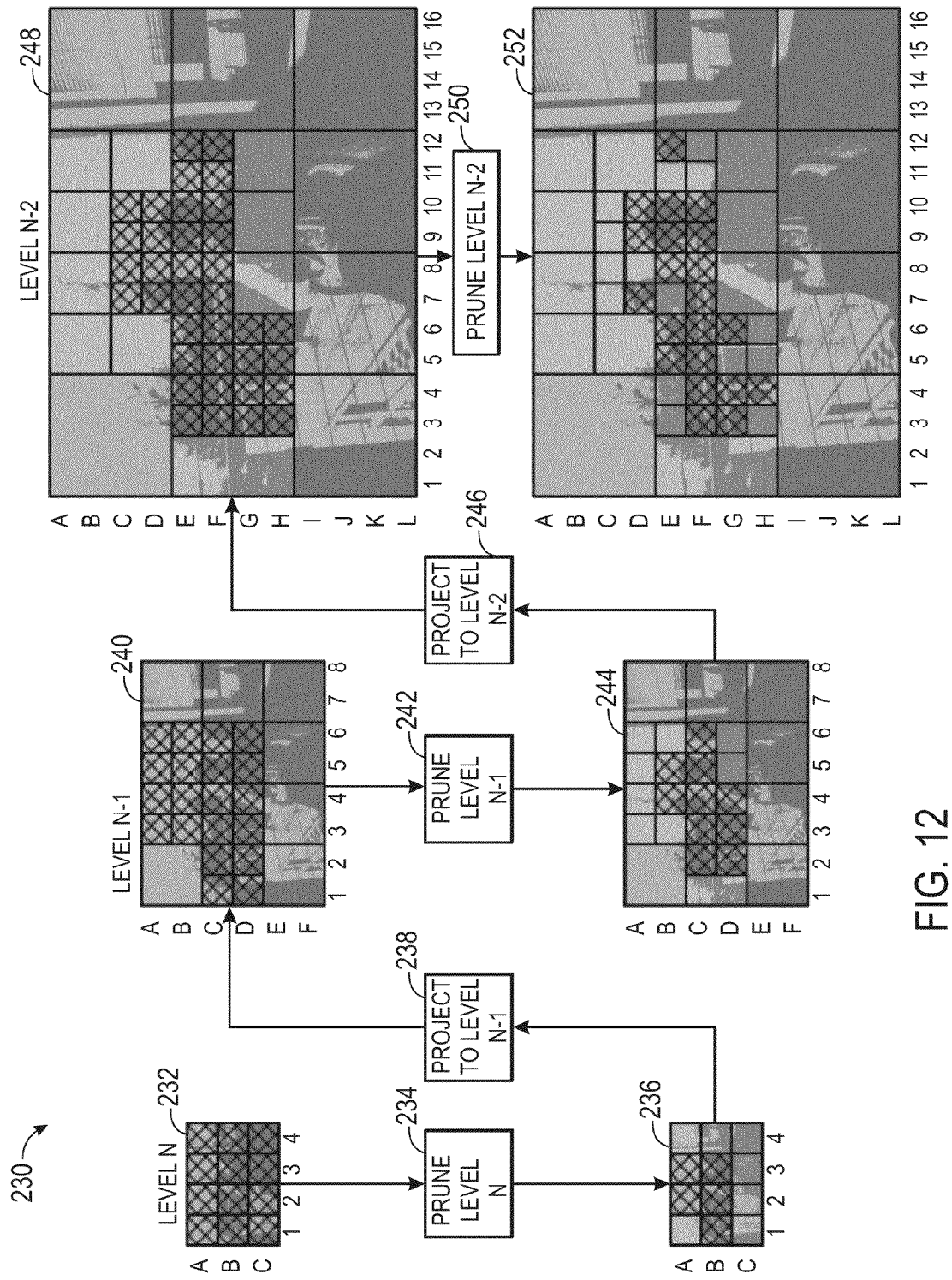
FIG. 12 illustrates how the alignment and pruning process may be applied to several successive pyramid levels, in accordance with the alignment and pruning processes depicted in FIGS. 8-11.

FIG. 12 provides further example that better illustrates how the pruning process (230) iteratively reduces the image area that needs to be processed in each subsequent pyramid level. For instance, FIG. 12 shows the processing of three pyramid levels n, n−1, and n−2, where level n may represent the top-most level of the image pyramid. First, the difference bitmap 232 that corresponds to the best-case shift at level n is pruned (step 234) based on a selected pruning threshold and the tile difference counts. For instance, in the present example, the pruning process 234 results in the tiles A1, A4, B4, C1, C2, C3, and C4 being pruned from the difference bitmap 232, as represented by the pruned difference bitmap 236, where shading is removed to indicate the pruned tiles. Further, it should be noted that the level n alignment vector component may be expressed as $(dx_n, dy_n)=(sx_n, sy_n)$, wherein $sx_n$ represents the best-case shift for level n in the x-direction, and $sy_n$ represents the best-case shift in the y-direction.

Next, only the selected tiles of the pruned difference bitmap 236 for level n are projected to the next level n−1, as indicated by reference number 238. As shown, the difference bitmap 240 for level n−1 may be twice the height and weight of its level n counterpart. Here, based on a scaling factor of two and assuming a constant tile size (e.g., 32×32 pixels), the region of the image covered by each tile from level n will correspond to four tiles in the level n−1 difference bitmap. For example, as shown in the difference bitmap 240, the selected tile B1 from level n may correspond to the tiles C1, C2, D1, and D2 in level n−1, and so forth. The difference bitmap 240 is then aligned to determine a best-case shift for level n−1, though it should be noted that only the active tiles (A3, A4, A5, A6, B3, B4, B5, B6, C1, C2, C3, C4, C5, C6, D1, D2, D3, D4, D5, and D6) are considered at level n−1. Based on the iterative vector computation process described above, the alignment vector at level n−1 may be expressed as $(dx_{n-1}, dy_{n-1})=(2dx_n+sx_{n-1}, 2dy_n+sy_{n-1})$, wherein $2dx_n$ and $2dy_n$ represent the vector components from the previous level n, but multiplied by a factor of two to account for scaling difference between level n and level n−1, and wherein $sx_{n-1}$ and $sy_{n-1}$ represent the best-case shift in the x-direction and the y-direction, respectively, at level n−1. The level n−1 difference bitmap 240 is also pruned (step 242) based on the pruning threshold. In the present example, the resulting pruned difference bitmap 244 shows that the pruning process 242 causes the active tiles A3, A4, A5, A6, B3, B6, C1, D1, D5, and D6 to be pruned, thus leaving only the active tiles B4, B5, C2, C3, C4, C5, C6, D2, D3, and D4 remaining to be projected to the next level n−2.

Again, only the selected tiles of the pruned difference bitmap 244 for level n−1 are projected (step 246) to the level n−2. Here, based on the projected tiles from level n−1, the active tiles in the level n−2 difference bitmap 248 include the tiles C7-C10, D7-D10, E3-E12, F3-F12, G3-G6, and H3-H6. These active tiles of the difference bitmap 248 are then processed to determine a best-case shift for level n−2. Thus, at level n−2, the alignment vector may be expressed as $(dx_{n-2}, dy_{n-2})=(2dx_{n-1}+sx_{n-2}, 2dy_{n-1}+sy_{n-2})$, wherein $2dx_{n-1}$ and $2dy_{n-1}$ represent the vector components from the previous level n−1, but multiplied by a factor of two to account for scaling difference between level n−1 and level n−2, and wherein $sx_{n-2}$ and $sy_{n-2}$ represent the best-case shift in the x-direction and the y-direction, respectively, for level n−2.

The level n−2 difference bitmap 248 is also pruned (step 250) based on the selected pruning threshold. As shown in FIG. 12, the pruning of the difference bitmap 248 causes the active tiles C7-C10, D8, E3, E4, E7, E11, F11, F12, G5, H3, H4, and H6 to be pruned and leaves only the active tiles B4, B5, C2, C3, C4, C5, C6, D2, D3, and D4 remaining (as shown by the pruned difference bitmap 252) to be projected to the next level n−3 (not shown in FIG. 2), and so on until the base level 0 is reached.

As discussed above, for certain HDR image generation processes, a composite HDR image may be generated using a low exposure, normal exposure, and high exposure image of the same image scene, which may be consecutive frames of the image scene. Thus, the alignment and pruning process may be performed to align both the low exposure image and the high exposure image with the normal exposure image (e.g., the reference image). As mentioned above, the alignment and pruning operations for each of the high exposure image and the low exposure image may occur sequentially or in parallel.

Further, with regard to the generation of the HDR composite image, if the total difference counts are particularly high (e.g., exceeds a threshold), then an alignment error may be likely, which may mean that the misalignment of the source and reference image is so severe that the two images cannot be aligned in an aesthetically acceptable manner. For instance, in some embodiments, the threshold may be between approximately 25 to 50 percent of the total pixels in an image at a particular pyramid level. Further, in instances where the difference count is relatively low, but concentrated within a few of the tiles within the difference bitmap, this may indicate that an object within the frame (e.g., a moving car) is moving. Both of the above-discussed conditions may result in blurring within certain areas of a composite HDR image, which may then actually render the HDR image as being aesthetically unpleasing to a user of the electronic device. Thus, when such alignment issues are detected, the ISP sub-system 32 may determine that a single best image (e.g., corresponding to the normal exposure image of the set of three images) might actually be more be more aesthetically appealing than a composite HDR image that possibly exhibits undesirable motion artifacts, and may thus return the single image instead of the composite HDR image. In some embodiments, the device 10 may display a notification message (e.g., on display 28) informing the user that a high level of motion or misalignment may be present in a set of images acquired for HDR image generation, and may give the user the option to select either an HDR image (by compositing the three images) or just a single image. For instance, in one embodiment, the device 10 may allow the user to preview both an HDR and non-HDR image of the target image scene, and to select the image that the user deems more aesthetically pleasing.

When compared to certain conventional image alignment algorithms, such as the Ward algorithm, embodiments of the image alignment algorithm (e.g., logic 100 of FIG. 5) disclosed herein may exhibit several key differences. First, as mentioned above, the present technique processes the bitmaps in tiles and prunes certain tiles to reduce the image area that is processed for each subsequent pyramid level, thus decreasing the computational cost of processing each subsequent pyramid level. In contrast, the Ward algorithm does not prune each level, but rather operates on entire images for each level, thus requiring substantially more computing cycles and effort. Additionally, as discussed above, the manner in which the difference bitmap 160 shown in FIG. 7 is generated also differs from the Ward algorithm. For instance, the difference bitmap 160 may be generated using the logic shown in Equation 2 above, whereas the Ward algorithm generates and combines bitmaps to generate an exclusion bitmap using an XOR operation.

Further, as will be appreciated, the present technique may produce slightly in excess of 3 bits of information per level, since one of nine possible combinations of x and y shifts is selected. For instance, Equation 1 above shows that the shift selections made at the level of the smallest bitmap in the pyramid contributes the most to the global alignment because the successive multiplication by the downscaling factor for each pyramid level (e.g., a factor of 2) will promote those bits to the most significant bit (MSB) position. Because of scaling, each bitmap has four times as many pixels as the preceding level. Thus, compared to the present technique, the Ward method expends substantially more effort each time it goes to a next larger level of the pyramid. Thus, larger and larger amounts of computing are spent on lesser and lesser significant bits of the alignment vector. The pruning techniques discussed above may thus reduce the average case computational complexity of the image alignment algorithm substantially when compared to the Ward algorithm. For instance, in some embodiments, the present technique may be capable of aligning two images by a factor of between approximately five to ten times faster five to ten times faster than an alignment process using the Ward algorithm.

Additional differences between the technique used by the Ward method and the techniques employed by the present disclosure for generating bitmaps are now discussed in more detail. For instance, as discussed above, the Ward algorithm uses two separate predicates to compute the threshold bitmap and the exclusion bitmap. This may include the application of a predicate to each pixel in an image and the generation of a bitmap with 1 bit per pixel packed into a 32-bit word, as shown by the pseudo-code logic below. To simplify the code, parts that deal with the remainder if the width is not a multiple of 32 are not shown.

```
//Bitmap generation using Ward Method
for row in [0...height−1]:
    w = 0
    for col in [0...width−1] in steps of 32:
        for i in [0...31]:
            p = predicate(image[row][col+i]) # Predicate returns 1 bit
            w = (w << 1) | p
        bitmap[row][col/32] = w # Bitmap is a 2d array of 32bit words
```

Figure 13:
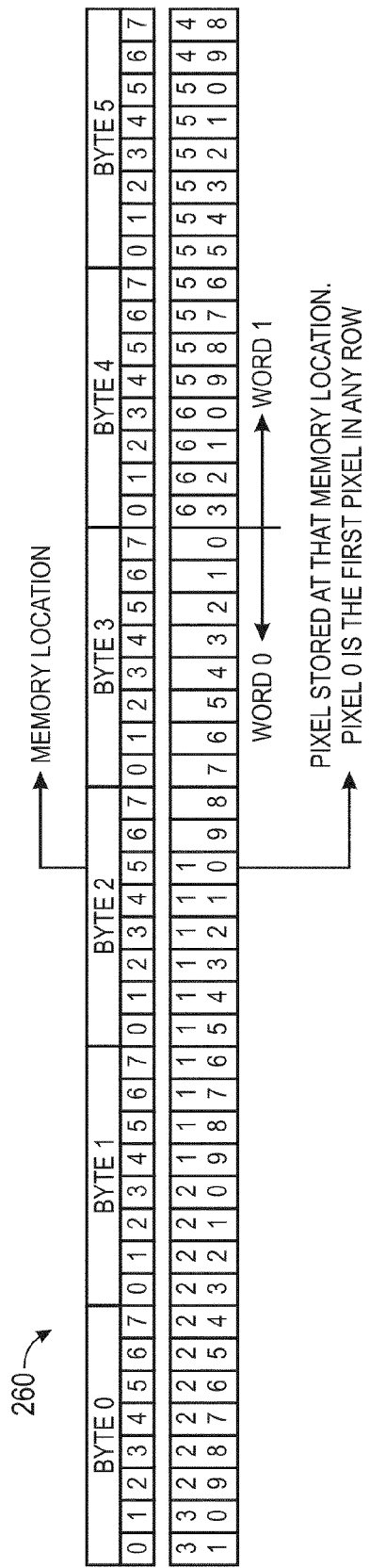
FIG. 13 shows a bit storage technique that may be used in conjunction with certain conventional image alignment algorithms.

FIG. 13 shows the structure 260 of a bitmap generated by the Ward method. As shown, using the Ward method, the bit for pixel 0 ends up in byte 3 and pixel 31 is in byte 0 on a little-endian processor. Every set of 32 bits follows the same pattern, with the pixel having the lowest column index ending up in the byte with the numerically highest byte address within a word. This corresponds to the natural way for little-endian processors to store an array of words. Thus, the Ward method generates the whole bitmap, generates difference counts, and then shifts the whole bitmap by 1 bit and then repeats for each shift case (sx and sy shift combinations of −1, 0 and 1). These shift operations are one of the most computationally costly steps of the Ward algorithm since it requires loading each word, shifting it and bringing in bits from the next word and clearing bits for edge words.

Figure 14:
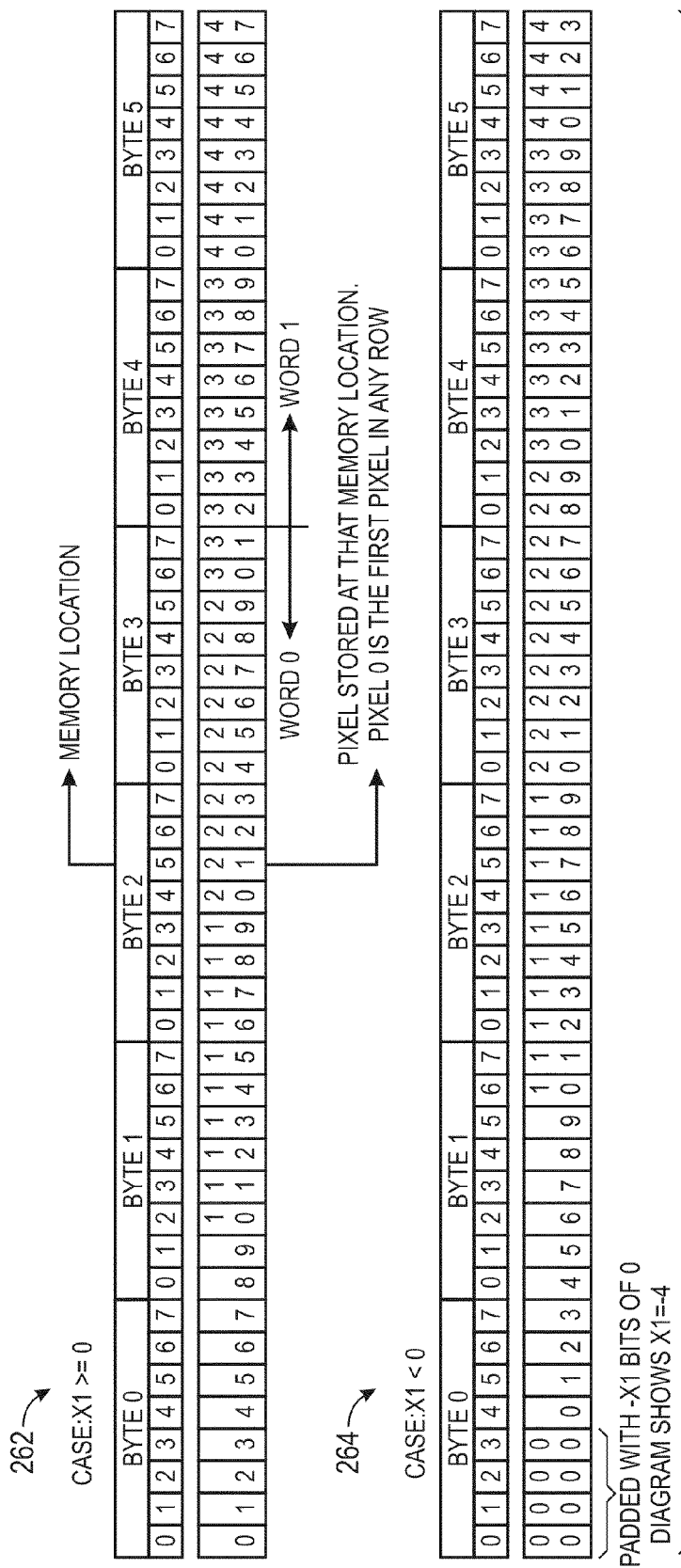
FIG. 14 shows a bit storage technique that may be used in conjunction with the image alignment algorithm depicted in FIG. 5, in accordance with an embodiment of the present technique.

In contrast, embodiments of the present technique may utilize a slightly more computationally expensive algorithm to generate the bitmap. However, the present technique uses the same bitmap for all nine (sx, sy) values and does not require any whole bitmap shifts. Thus, overall processing speed and efficiency increases even though the generation of the initial bitmap data may require additional computational costs. FIG. 14 shows structures 262, 264 of the bitmap that may be generated using the above-discussed image alignment techniques, in accordance with one embodiment. As shown, the bits with low column indices are stored at the numerically lower byte addresses within a word. Depending on the current best estimate of the alignment vector and the clipping area of the source image with respect to the reference image, there exists a leftmost point (x1, y1) in the reference image coordinate system that the algorithm can access. If the leftmost point is left of the origin, i.e., if x1<0, as shown by reference number 264, the bitmaps may be padded on the left with −x1 bits of 0. As shown in the present example, if x1 is −4, then the left side of the bitmap is padded with four bits of 0 (e.g., in the negative x-direction). Similarly, when y1<0 the beginning of the bitmap is padded with −y1 rows of zero. Further, the bottom of the reference bitmap may also be padded with two rows of 0, and the right edge may be padded with at least one full word of zeros.

Further, in the unpadded case 262 (x1≧0), the storage of bits looks like a natural representation since byte/bit addresses directly correspond to pixel locations. As will be appreciated, this type of representation may be referred to big-endian format. However, in the context of little-endian processors, this is actually considered an unnatural representation to generate and may require more computing effort. This representation may also entail slightly more complex corner cases on account of the fact that padding by −x1 bits means that the convenient structure of the 32 count inner loop where a block of 32 pixels corresponds to a bitmap word does not exist anymore, and thus some bits must be carried over from word to word. But it is also the case that it is a very natural format for a little-endian processor to consume.

To understand why this is so, consider the first word of the bitmap. This word contains all the bits required to process a 29 pixel region considering that the algorithm explores within a 3 pixel neighborhood (−1, 0, +1 shifts in x- and y-directions). The present technique may employ a bitmap difference logic (Equation 2) that does not count as a difference those pixels where both bitmap_a and bitmap_b of the reference image are 0 regardless of the value of the corresponding bits for the source image. Thus by loading one single word, using the difference logic described above, and then doing a logical right shift of the word and repeating the the operation, all the three cases of sx=−1, 0, 1 may be processed from a single load of a bitmap word.

Further, in the case of unaligned loads, consider an unaligned load from byte 3 of the bitmap, as shown in FIG. 14. This will load a word that consists of the bytes 3, 4, 5, 6 (not shown). This word contains all the bits needed to process pixels 24 to 52. By configuring the logic to process 24 pixels per load and then incrementing the load address by 3 bytes, the result is an efficient natural way of processing the difference counts. However, as incrementing by 3 may cause the load address to become unaligned, in the general case, for a processor with n bytes per word, 8(n−1) pixels may be processed per unaligned load followed by incrementing the word address by n−1 bytes. Thus, by performing the unaligned load, the processor hardware has in effect fetched two naturally aligned words and combined the required bytes together to generate a new word automatically, whereas previous difference computation techniques, such as those employed by the Ward algorithm, does this explicitly in software at considerable computational cost. Logic, in accordance with one embodiment, for performing the bitmap processing using the present technique is shown below:

```
Algorithm compare_windows(count_a, ref-tile_bitmap_a, ref_tile_
bitmap_b,
src_tile_bitmap_a, src_tile_bitmap_b)
{
    height = Number of rows of src_tile_bitmap_a
    width = Number of columns of src_tile_bitmap_a ignoring bits added for
        padding
    byte_width = (width + 7)/8
    //Width and height will be TILESIZE for interior tiles and smaller for
    //edge tiles.
    for row in [0..height−1]
    {
        for col in [0..byte_width−1] in steps of 3:
        {
            //Load unaligned unsigned word. The unaligned loads and
            //single bit shifts together eliminate the need for whole
            //bitmap shift operations like in the Ward method and let us
            //compute differences for 9 neighboring tile shift locations
            //in one single pass.
            sa = * ((word *) ((byte *) src_tile_bitmap_a[row][0]) +
                col))
            sb = * ((word *) ((byte *) src_tile_bitmap_b[row][0]) +
                col))
            for ty in [0,1,2]:
            {
                //Load unaligned unsigned word.
                ra =* ((word *) ((byte *) ref_tile_bitmap_a[row+ty]
                    [0]) + col))
                rb =* ((word *) ((byte *) ref_tile_bitmap_b[row+ty]
                    [0]) + col))
                diff = (ra & sb) | (rb & sa)
                count_a[ty][0] += Number of bits set in the 3 least
                    significant bytes of diff
                ra = ra >_> 1; rb = rb >_> 1;
                diff = (ra & sb) | (rb & sa)
                count_a [ty][1] += Number of bits set in the 3 least
                    significant bytes of diff
                ra = ra >_> 1; rb = rb >_> 1;
                diff = (ra & sb) | (rb & sa)
                count_a[ty][2] += Number of bits set in the 3 least
                    significant bytes of diff
            }
        }
    }
}
```

In the logic shown above, the inputs to the function "compare_windows( )" may include one tile of each of the reference bitmaps (a and b) and each of the source bitmaps (a and b). For instance, the inputs may be two-dimensional arrays, each representing one tile of bitmaps with appropriate padding. The output of the compare_windows function produces count_a[3][3], which stores the difference counts between the reference and source tiles by applying shifts of −1, 0, and 1 in each of the x and y directions to the source tile.

It should be noted that if a similar unaligned load is attempted on the representation shown in FIG. 13, the result is a jumbled up word which is not useful or suitable for image processing. In essence the representation shown in FIG. 14 is slightly more expensive to generate in terms of computing effort, but that upfront expense is amortized by providing the ability to reuse the same representation nine times (for each possible shift) while completely eliminating explicit whole-bitmap shifts by replacing them with two word fetch and combine operations that are implicitly performed by hardware.

Thus, to summarize, the net effect of these transformations is that an unaligned load operation can be used to access words from the bitmaps, and the processing hardware (e.g., ISP sub-system 32) may automatically fetch the bits required to compare up to 24 pixels. Essentially, the techniques disclosed herein anticipate how the load-store unit of a little-endian processor would typically operate on encountering an unaligned load operation and may maintain the bitmap in a form that lets the load-store unit circuit automatically do most of the bit-shift operations that would otherwise be explicitly done if using the Ward method. Using an alternate packed form would make this method possible on a big-endian processor as well. For instance, instance, the Ward method uses a total of 9 instances of bitmap comparisons with bitmap shifts where appropriate that correspond to sx, sy∈{1, 0, 1}. In contrast, the present embodiments evaluate all nine shift positions in a single pass over the bitmaps. For example, one unaligned load per bitmap may be used for each of the cases of sy∈{1, 0, 1}. The loaded reference bitmap words may be used as is for the case sx=-1, and the words are shifted right unsigned by one bit each time for the case sx=0 and the case sx=1. As can be appreciated, the unsigned shift clears the appropriate bits, and the combination of the difference logic, unaligned load, and unaligned shift operations yield difference counts without the need for expensive whole bitmap shift operations that would be required if the Ward algorithm were used.

The techniques described herein have generally focused on translation vectors. In the general case, some amount of rotation from the camera tilting as well as shear caused by a rolling shutter may also be present during image capture. It should be understood, however, that the tiled alignment algorithm described above is also well suited for estimating rotation and shear. For instance, unlike the Ward algorithm, which processes entire images at a time and thereby incorrectly lumps the net effect of rotation and shear into the alignment vector, the tiled approach described herein permits movement of each tile to be estimated independently. When the translation vectors for a set of tiles spread across the image are available, curve fitting of corresponding points (e.g. the centers of the tiles) may be used to estimate the degree of rotation and shear, thus providing yet another advantage over the Ward algorithm.

As will be understood, the various techniques described above and relating to the HDR imaging are provided herein by way of example only. Accordingly, it should be understood that the present disclosure should not be construed as being limited to only the examples provided above. Further, it should be appreciated that the HDR imaging techniques may be implemented in any suitable manner, including hardware (suitably configured circuitry), software (e.g., via a computer program including executable code stored on one or more tangible computer readable medium), or via using a combination of both hardware and software elements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A non-transitory program storage device comprising instructions stored thereon to cause one or more processors to:
   obtain a first image acquired at a first time and being representative of a scene;
   obtain a second image acquired at a second time and being representative of the scene;
   obtain at least a portion of a first image pyramid comprising a plurality of levels including a top level and a base level, wherein the base level comprises a full resolution version of the first image, and wherein each level above the base level comprises a version of the first image that is down-sampled with respect to a level immediately below it;
   obtain at least a portion of a second image pyramid comprising a plurality of levels including a top level and a base level, wherein the base level comprises a full resolution version of the second image, and wherein each level above the base level comprises a version of the second image that is down-sampled with respect to a level immediately below it;
   determine, for each level of the first and second image pyramids beginning from the top-most level, a respective alignment vector for a current level k, wherein the instructions to cause the one or more processors to determine comprise instructions to cause the one or more processors to—
      obtain a difference bitmap based, at least in part, on the versions of the first and second images corresponding to the current level k of the first and second image pyramids, wherein the difference bitmap includes an active area having a plurality of tiles,
      apply a plurality of shift cases to each of the tiles of the active area,
      determine a shift value for each of the tiles of the active area, wherein each of the plurality of shift values represents a relative motion between the first and second images, for each shift case,
      identify an alignment vector for the current level k based, at least in part, on the plurality of shift values,
      identify, if the current level k is above the base level of the first and second image pyramids, zero or more tiles from the active area in the current level k of each of the first and second image pyramids based on a first threshold amount of relative motion, and designate tiles in a subsequent level k-1 as an active area based, at least in part, on tiles of the current level k other than the identified zero or more tiles;
   determine a combined alignment vector based, at least in part, on the identified alignment vector for each level of the first and second image pyramids; and
   align the first and second images based, at least in part, on the combined alignment vector.

2. The non-transitory program storage device of claim 1, wherein each corresponding level of the first and second image pyramids has the same resolution.

3. The non-transitory program storage device of claim 1, wherein the instructions to cause the one or more processors to determine a shift value for each of the tiles of the active area comprise instructions to cause the one or more processors to:
   determine a value for each of the shift cases for each of the tiles of the active area; and
   combine, for each of the tiles of the active area, all of the determined values to generate a shift value.

4. The non-transitory program storage device of claim 1, wherein the instructions to cause the one or more processors to identify an alignment vector for the current level k comprise instructions to cause the one or more processors to:
   identify a smallest shift value from the plurality of shift values; and
   identify an alignment vector for the current level k based, at least in part, on the identified smallest shift value.

5. The non-transitory program storage device of claim 1, wherein the instructions to cause the one or more processors to designate tiles in a subsequent level k-1 as an active area comprise instructions to cause the one or more processors to designate, for each of the tiles of the current level k other than the identified zero or more tiles, a plurality of tiles in a subsequent k-1 level.

6. The non-transitory program storage device of claim 1, further comprising instructions to cause the one or more processors to skip the instructions to (1) identify zero or more tiles from the active area in the current level k of each of the first and second image pyramids and (2) designate tiles in a subsequent level k-1 as an active area when the current level k is within a top-most x levels, where x≦3.

7. The non-transitory program storage device of claim 1, further comprising instructions to cause the one or more processors to:
 obtain a third image acquired at a third time and being representative of the scene;
 obtain at least a portion of a third image pyramid comprising a plurality of levels including a top level and a base level, wherein the base level comprises a full resolution version of the third image, and wherein each level above the base level comprises a version of the third image that is down-sampled with respect to a level immediately below it;
 determine, for each level of the second and third image pyramids beginning from the top-most level, a respective alignment vector for a current level m, wherein the instructions to cause the one or more processors to determine comprise instructions to cause the one or more processors to—
  obtain a difference bitmap based, at least in part, on the versions of the second and third images corresponding to the current level m of the second and third image pyramids, wherein the difference bitmap includes an active area having a plurality of tiles,
  apply a plurality of shift cases to each of the tiles of the active area,
  determine a shift value for each of the tiles of the active area, wherein each of the plurality of shift values represents a relative motion between the second and third images, for each shift case,
  identify a second alignment vector for the current level m based, at least in part, on the plurality of shift values,
  identify, if the current level m is above the base level of the second and third image pyramids zero or more tiles from the active area in the current level m of each of the second and third image pyramids based on a second threshold amount of relative motion, and designate tiles in a subsequent level m-1 as an active area based, at least in part, on tiles of the current level m other than the identified zero or more tiles;
 determine a second combined alignment vector based, at least in part, on the identified second alignment vector for each level of the second and third image pyramids; and
 align the second and third images based, at least in part, on the second combined alignment vector.

8. The non-transitory program storage device of claim 7, further comprising instructions to cause the one or more processors to merge the first, second, and third images to generate a high dynamic range (HDR) image, wherein the instructions to merge are executed after the instructions to align the first and second images and align the second and third images.

9. An image processing sub-system, comprising:
 an image capture unit; and
 one or more processors coupled to the image capture unit and configured to execute instructions stored in a memory to cause the one or more processors to—
  obtain first and second images of a scene from the image capture unit, wherein the first and second images are temporally offset with respect to one another,
  generate at least a portion of a first image pyramid of down-sampled representations of the first image, wherein the first image forms a base level of the first image pyramid, and wherein each level above the base level comprises a down-sampled version of the first image,
  generate at least a portion of a second image pyramid of down-sampled representations of the second image, wherein the second image forms a base level of the second image pyramid, and wherein each level above the base level comprises a down-sampled version of the second image,
  operate on the first and second image pyramids beginning at the top-most level to determine a combined alignment vector based, at least in part, on a difference bitmap for a current level, wherein the difference bitmap includes an active area having a plurality of tiles, and wherein the instructions to cause the one or more processors to operate comprise instructions to cause the one or more processors to—
   select a pixel shift operation from a plurality of pixel shift operations that, when applied to the difference bitmap yields a smallest shift value,
   determine an alignment vector for the current level based, at least in part, on the smallest shift value,
   prune, when the current level is outside a top-most x levels, one or more tiles from the active area based, at least in part, on a pruning threshold, wherein the active area is determined based at least partially upon the locations of un-pruned tiles from a previous level,
   combine the alignment vectors from each level to produce the combined alignment vector, and
  align the first and second images based, at least in part, on the combined alignment vector.

10. The image processing sub-system of claim 9, wherein an image processing pipeline comprises at least some of the image processing sub-system.

11. The image processing sub-system of claim 9, wherein the instructions to cause the one or more processors to prune comprise instructions to cause the one or more processors to:
 determine values for each of the plurality of tiles in the active area based, at least in part, on the selected pixel shift operation;
 order the plurality of tiles in accordance with their determined values;
 select each tile in turn beginning with that tile having the largest determined value just until a tile is reached that has a determined value less than the pruning threshold;
 discard the last selected tile; and
 discard all other non-selected tiles.

12. The image processing sub-system of claim 9, wherein the instructions to cause the one or more processors to obtain a difference bitmap, comprise instructions to cause one or more processors to:
 generate a first histogram corresponding to the first image and a second histogram corresponding to the second image;
 select a first threshold based, at least in part, on the first histogram and a second threshold based, at least in part, on the second histogram;

generate a first bitmap for the first image at the current level by, for each pixel of the first image, comparing the value of a current pixel to the first threshold and, if the value is greater than the first threshold, setting the current pixel value to '1' and otherwise setting the current pixel value to '0';

generate a second bitmap for the first image at the current level by, for each pixel of the first image, comparing the value of a current pixel to the first threshold and, if the value is less than the first threshold, setting the current pixel value to '1' and otherwise setting the current pixel value to '0';

generate a first bitmap for the second image at the current level by, for each pixel of the second image, comparing the value of a current pixel to the second threshold and, if the value is greater than the second threshold, setting the current pixel value to '1' and otherwise setting the current pixel value to '0';

generate a second bitmap for the second image at the current level by, for each pixel of the second image, comparing the value of a current pixel to the second threshold and, if the value is less than the second threshold, setting the current pixel value to '1' and otherwise setting the current pixel value to '0'; and combine the first and second bitmaps of the first and second images to obtain a difference bitmap for the current level.

13. The image processing sub-system of claim 9, further comprising instructions to cause the one or more processors to:

obtain a third image of the scene from the image capture unit, wherein the third images is temporally offset with respect to the first and second images;

generate at least a portion of a third image pyramid of down-sampled representations of the third image, wherein the third image forms a base level of the third image pyramid, and wherein each level above the base level comprises a down-sampled version of the third image;

operate on the second and third image pyramids beginning at the top-most level to determine a second combined alignment vector based, at least in part, on a difference bitmap for a current level, wherein the difference bitmap includes an active area having a plurality of tiles, and wherein the instructions to cause the one or more processors to operate comprise instructions to cause the one or more processors to— select a pixel shift operation from a plurality of pixel shift operations that, when applied to the difference bitmap yields a smallest shift value, determine an alignment vector for the current level based, at least in part, on the smallest shift value, prune, when the current level is outside a top-most x levels, one or more tiles from the active area based, at least in part, on the pruning threshold, wherein the active area is determined based at least partially upon the locations of un-pruned tiles from a previous level, combine the alignment vectors from each level to produce the second combined alignment vector; and align the second and third images based, at least in part, on the second combined alignment vector.

14. The image processing sub-system of claim 13, further comprising instructions to cause the one or more processors to merge the first, second and third images into a high dynamic range (HDR) image.

15. The image processing sub-system of claim 9, wherein the image processing sub-system is incorporated into a digital camera device.

16. The image processing sub-system of claim 15, wherein the digital camera device is incorporated into a mobile telephone unit.

17. An image processing method, comprising:

obtaining first and second images of a scene, wherein the first and second images are temporally offset with respect to one another;

generating at least a portion of a first image pyramid of down-sampled representations of the first image, wherein the first image forms a base level of the first image pyramid, and wherein each level above the base level comprises a down-sampled version of the first image;

generating at least a portion of a second image pyramid of down-sampled representations of the second image, wherein the second image forms a base level of the second image pyramid, and wherein each level above the base level comprises a down-sampled version of the second image;

operating on the first and second image pyramids beginning at the top-most level to determine a combined alignment vector based, at least in part, on a difference bitmap for a current level, wherein the difference bitmap includes an active area having a plurality of tiles, and wherein the act of operating comprises— selecting a pixel shift operation from a plurality of pixel shift operations that, when applied to the difference bitmap yields a smallest shift value, determining an alignment vector for the current level based, at least in part, on the smallest shift value, prune, when the current level is outside a top-most x levels, one or more tiles from the active area based, at least in part, on a pruning threshold, wherein the active area is determined based at least partially upon the locations of un-pruned tiles from a previous level, and combining the alignment vectors from each level to produce the combined alignment vector; and aligning the first and second images based, at least in part, on the combined alignment vector.

18. The method of claim 17, further comprising:

obtaining a third image of the scene that is temporally offset with respect to the first and second images;

generating at least a portion of a third image pyramid of down-sampled representations of the third image, wherein the third image forms a base level of the third image pyramid, and wherein each level above the base level comprises a down-sampled version of the third image;

operating on the second and third image pyramids beginning at the top-most level to determine a second combined alignment vector based, at least in part, on a difference bitmap for a current level, wherein the difference bitmap includes an active area having a plurality of tiles, and wherein the act of operating comprises— selecting a pixel shift operation from a plurality of pixel shift operations that, when applied to the difference bitmap yields a smallest shift value, determining an alignment vector for the current level based, at least in part, on the smallest shift value, pruning, when the current level is outside a top-most x levels, one or more tiles from the active area based, at least in part, on the pruning threshold, wherein the active area is determined based at least partially upon the locations of un-pruned tiles from a previous level, and combining the alignment vectors from each level to produce the second combined alignment vector; and aligning the second and third images based, at least in part, on the second combined alignment vector.

19. The method of claim 18, further comprising merging the first, second and third images into a high dynamic range (HDR) image.

* * * * *